Jan. 13, 1959 L. J. BISHOP ET AL 2,868,138
MECHANICALLY OPERATED POWER AND
FREE CONVEYOR SYSTEM
Filed June 6, 1955 10 Sheets-Sheet 1

INVENTORS
LEONARD J. BISHOP
PAUL KLAMP
BY
Whittemore, Hulbert & Belknap
ATTORNEYS Jan. 13, 1959

L. J. BISHOP ET AL 2,868,138

MECHANICALLY OPERATED POWER AND
FREE CONVEYOR SYSTEM

Filed June 6, 1955

INVENTORS
LEONARD J. BISHOP
PAUL KLAMP
BY
Whittemore, Hulbert & Belknap
ATTORNEYS

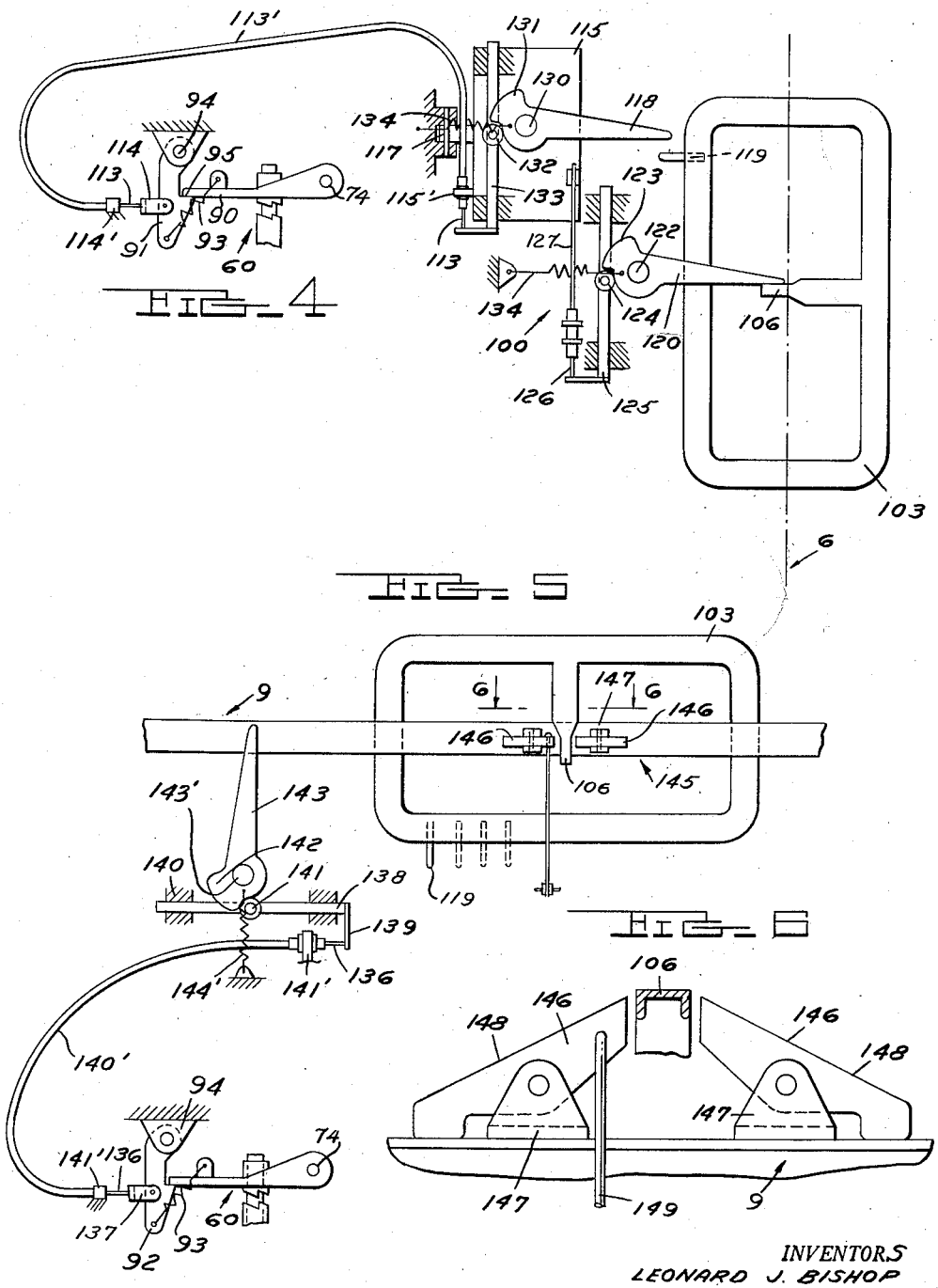

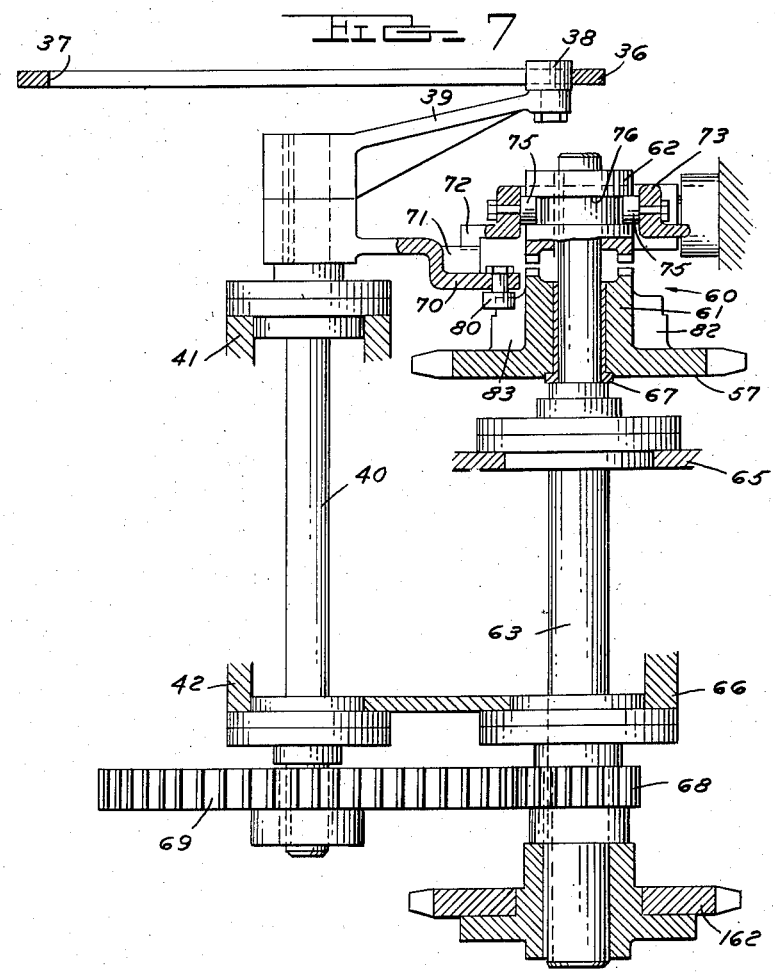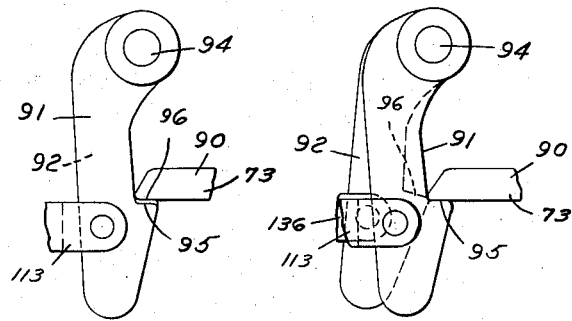

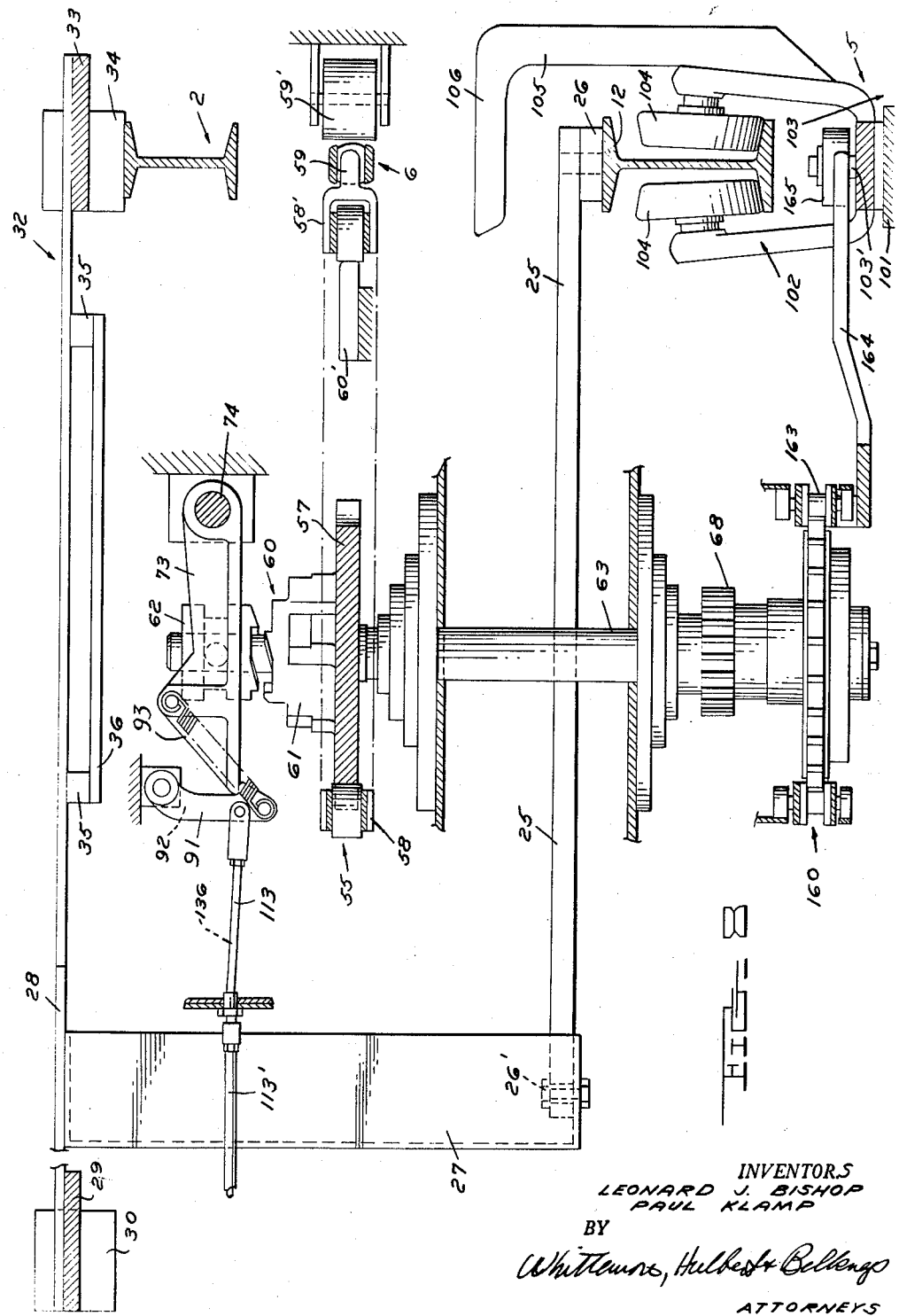

Jan. 13, 1959
L. J. BISHOP ET AL
2,868,138
MECHANICALLY OPERATED POWER AND
FREE CONVEYOR SYSTEM
Filed June 6, 1955
10 Sheets-Sheet 7
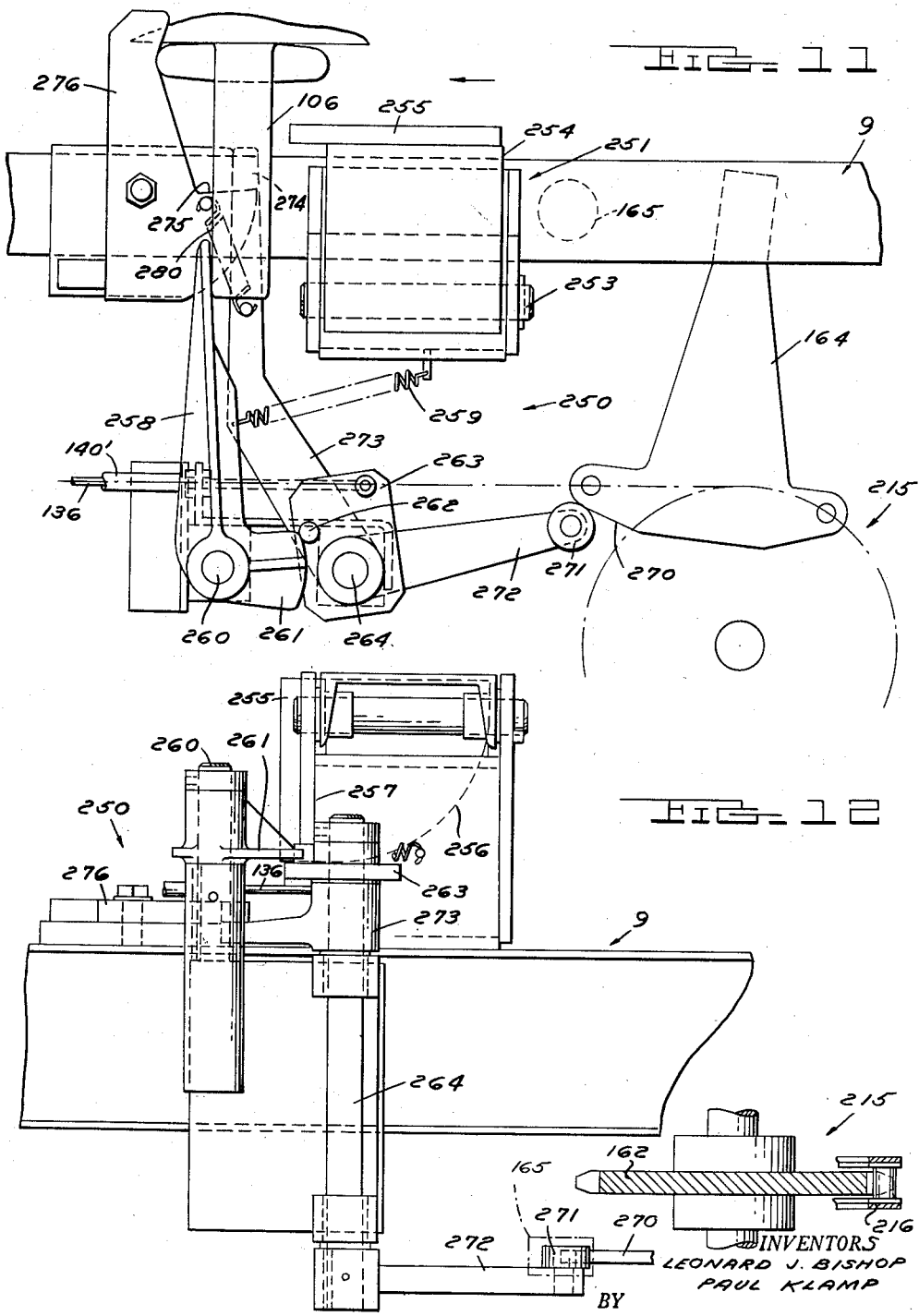
INVENTORS
LEONARD J. BISHOP
PAUL KLAMP
BY
Whittemore, Hulbert & Belknap
ATTORNEYS Jan. 13, 1959 L. J. BISHOP ET AL 2,868,138
MECHANICALLY OPERATED POWER AND
FREE CONVEYOR SYSTEM
Filed June 6, 1955 10 Sheets-Sheet 8
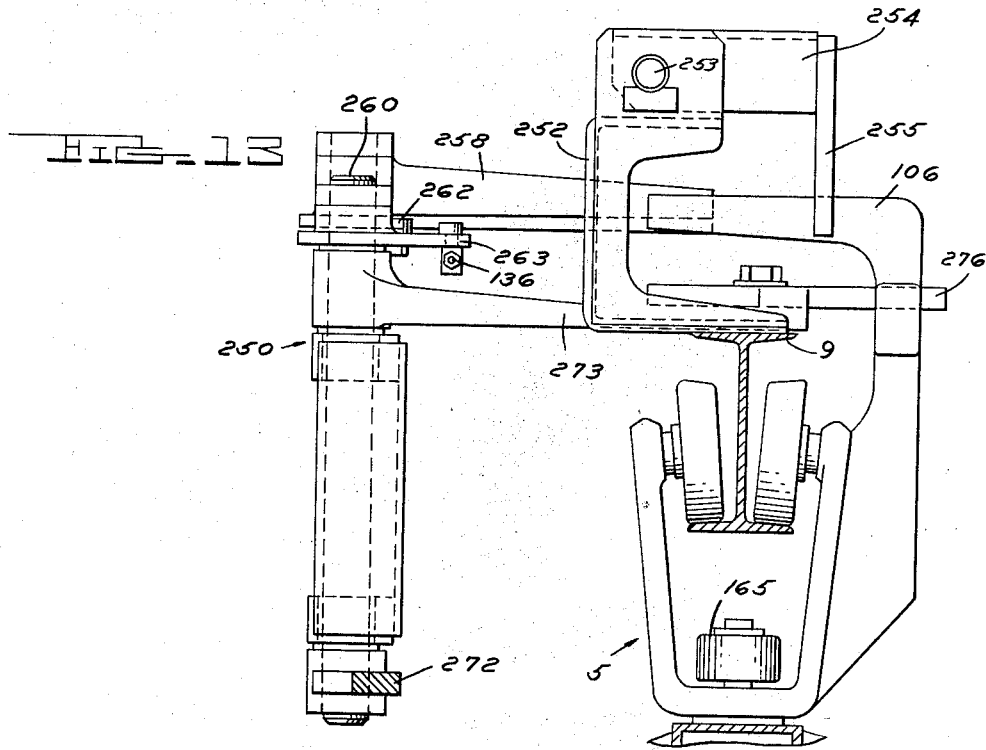
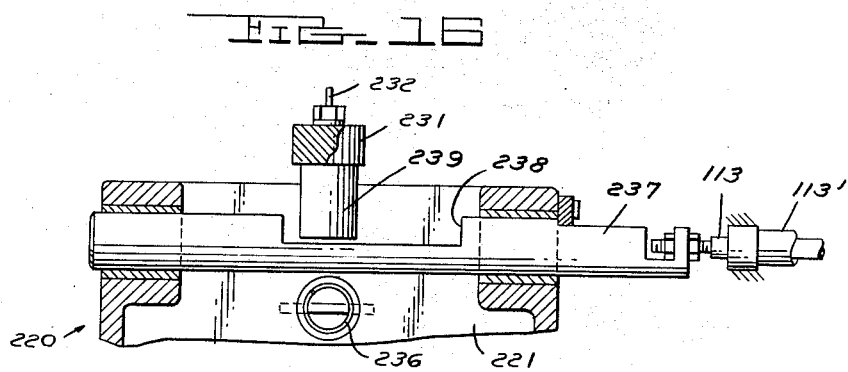
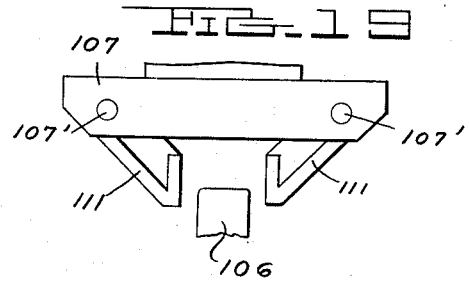
INVENTORS
LEONARD J. BISHOP
PAUL KLAMP
BY
Whittemore, Hulbert & Belknap
ATTORNEYS

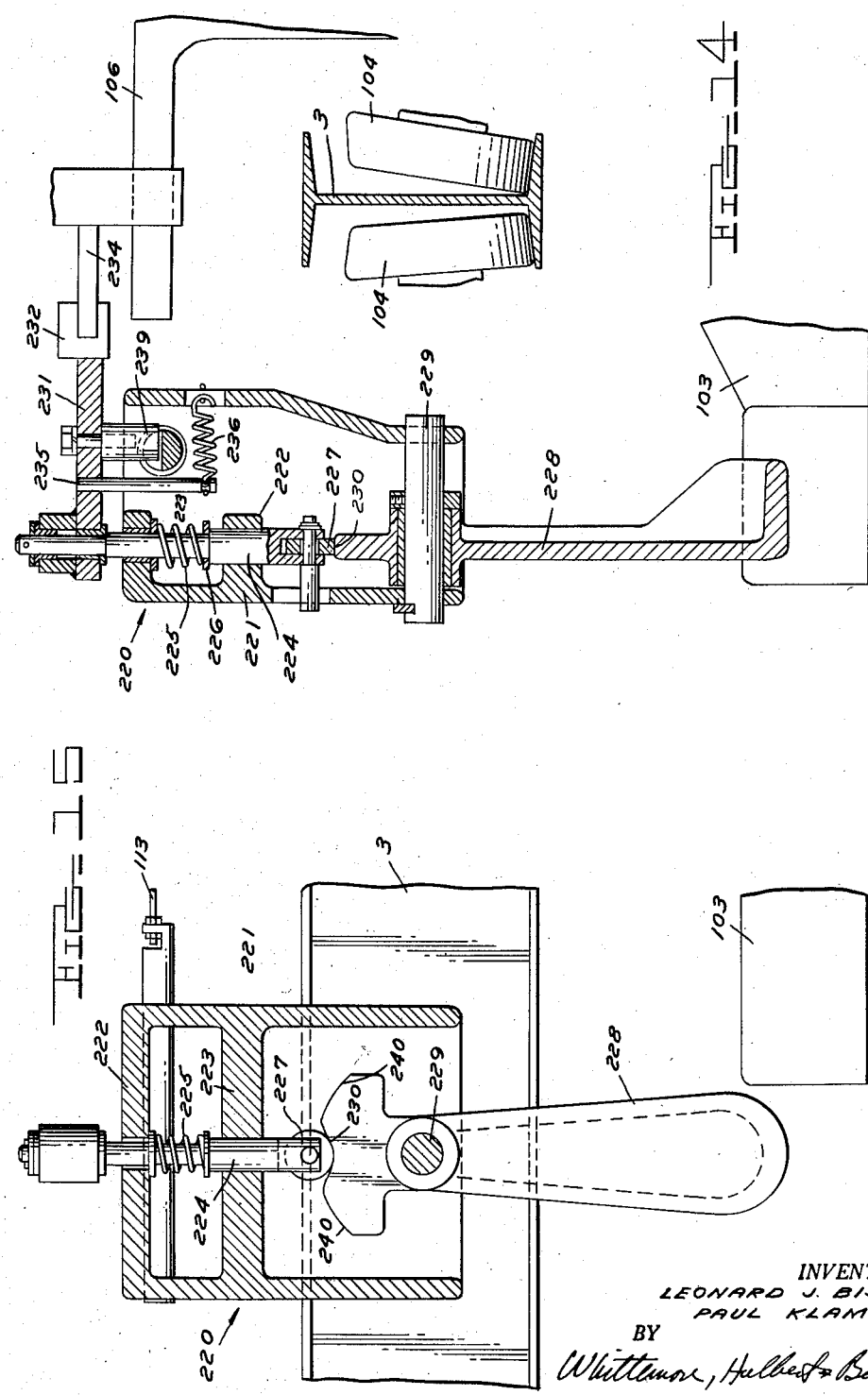

Jan. 13, 1959
L. J. BISHOP ET AL
MECHANICALLY OPERATED POWER AND
FREE CONVEYOR SYSTEM
2,868,138
Filed June 6, 1955
10 Sheets-Sheet 10
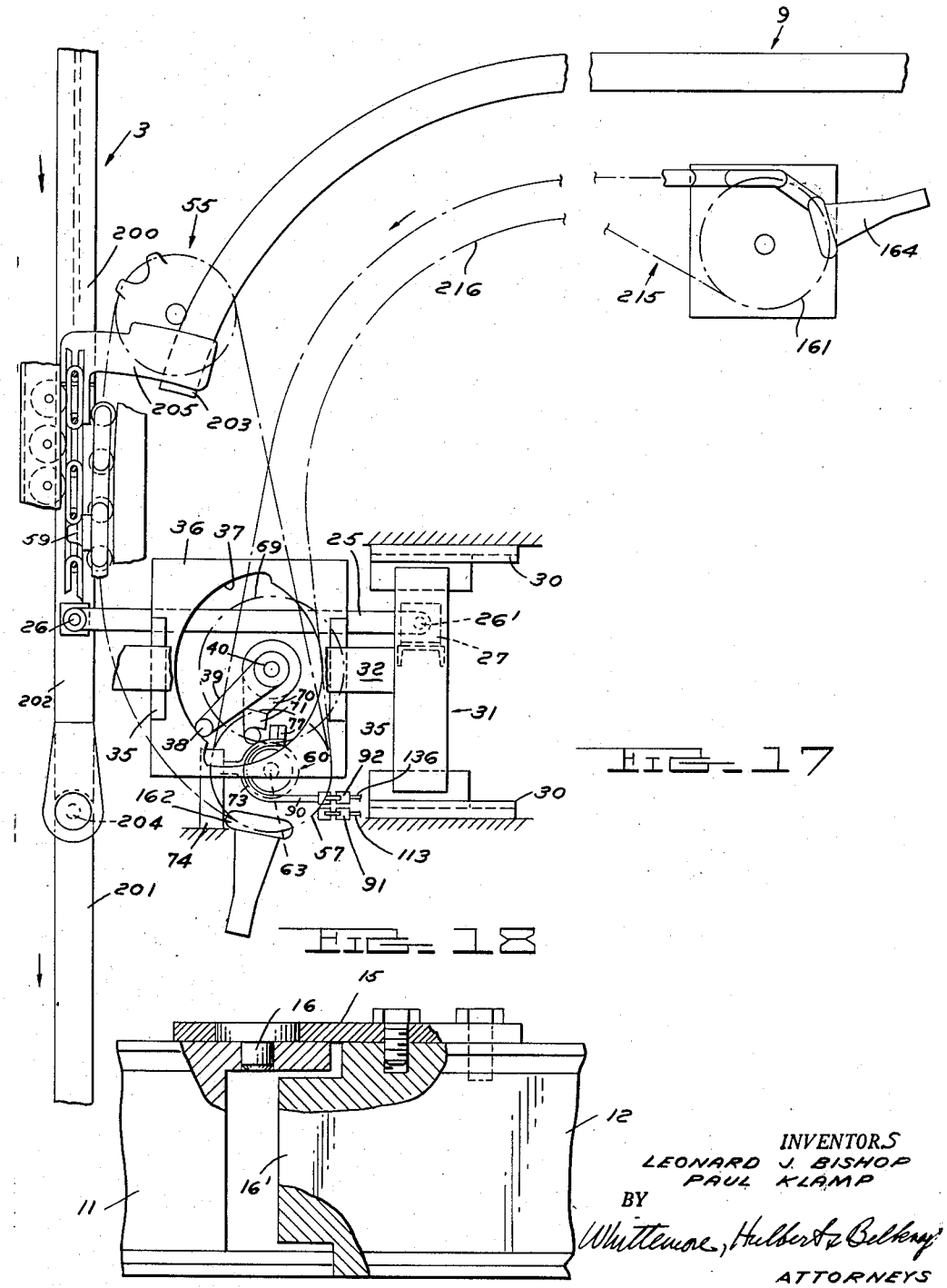

United States Patent Office 2,868,138
Patented Jan. 13, 1959

2,868,138

MECHANICALLY OPERATED POWER AND FREE CONVEYOR SYSTEM

Leonard J. Bishop, Birmingham, and Paul Klamp, Detroit, Mich., assignors to Mechanical Handling Systems, Inc., Detroit, Mich., a corporation of Michigan Application June 6, 1955, Serial No. 513,452

47 Claims. (Cl. 104—88)

This invention relates to a power and free conveyor system having power driven work advancing trolleys which are movable along a top track and having work carrying trolleys which are movable along a main bottom track by the work advancing trolleys.

More particularly, the present invention concerns itself with conveyors of the above general type having means for switching work carrying trolleys from a position on the main track to a position on a branch or free line track where additional operations may be performed on the work supported by the work carrying trolleys without interrupting travel of other work carrying trolleys along the main track.

One object of the invention is to provide a power and free conveyor system with automatic track switches for moving carriers from the main track to a branch track and from a branch track to the main track wherein the power for operating the track switches and for moving the carriers through said track switches is provided by the conveyor chain which propels the carriers along the main track.

Still another object of this invention is to provide mechanically operating signal means for controlling the switching referred to in the preceding paragraph.

A further object of the invention is to provide a conveyor system having the foregoing advantages and at the same time composed of a relatively few simple parts capable of being inexpensively manufactured, assembled and installed.

Other objects will become apparent as the following description proceeds especially when taken in conjunction with the accompanying drawings wherein:

Figure 4 is a diagrammatic view illustrating a work carrying trolley on the main track approaching the exit switch and showing also the means whereby the operation of the exit switch is controlled by the work carrying trolley.

Figure 5 is similar to Figure 4 but shows the work carrying trolley on the branch track and also shows the means associated with the branch track for controlling operation of the exit switch.

Figure 6 is a view taken along the line 6—6 on Figure 5.

Figure 7 is a sectional view taken along the lines 7—7 of Figure 2.

Figure 8 is a sectional view taken along the line 8—8 of Figure 2.

Figure 9 is an enlarged detail view of the latches which control the engagement of the clutch for initiating operation of the switch track.

Figure 10 is similar to Figure 9 but shows the parts in a different position.

Figure 11 is an enlarged plan view of a portion of the branch track and associated mechanism including means for controlling the operation of the entrance switch track.

Figure 12 is a side elevational view of the structure shown in Figure 11.

Figure 13 is a view partly in section also illustrating the structure of Figures 11 and 12 and taken at right angles to the latter figures.

Figure 14 is a sectional view on line 14—14 of Fig. 1, illustrating the control means for the entrance switch located along the main track and also showing its relationship with the work advancing trolleys.

Figure 15 is a sectional view taken at right angles to Figure 14.

Figure 16 is a sectional view of a portion of the structures shown in Figures 14 and 15.

Figure 17 is a semi-diagrammatic plan view of a portion of the conveyor structure including the entrance switch and associated structure.

Figure 18 is an enlarged view showing the pivotal connection between the exit switch and the main track; and Figure 19 is a view looking in the direction of the arrow in Figure 3.

Figure 1:
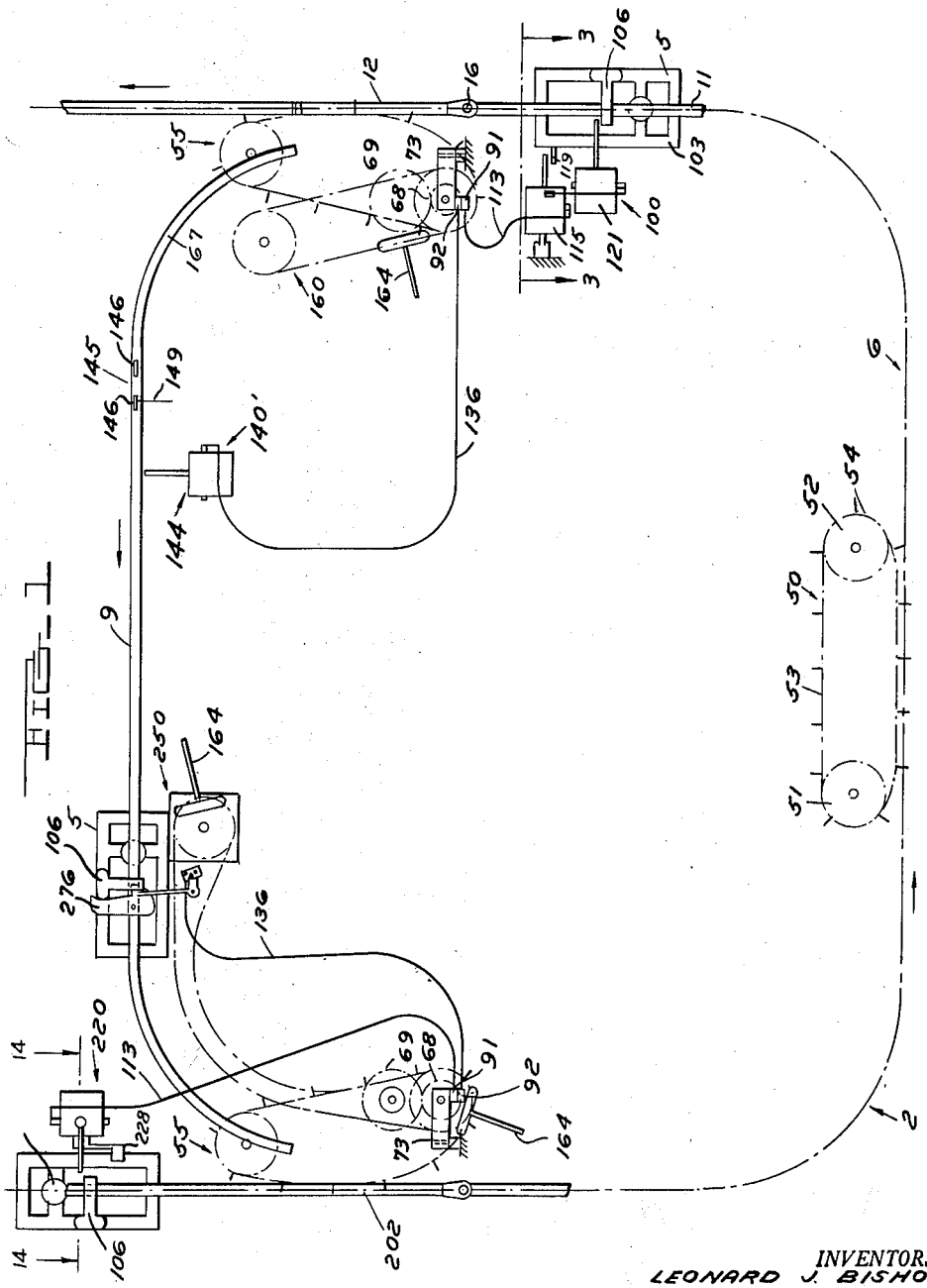
Figure 1 is a diagrammatic view of a conveyor system constructed in accordance with the present invention.

The conveyor system selected herein for the purposes of illustration is of the mono-rail type comprising an upper track 2, a lower or main track 3, work advancing trolleys 4 supported on and movable along the upper track, work carrying trolleys 5 supported on and movable along the lower track 3 and a power driven chain 6 connected to the trolleys 4 for advancing the same along the upper track together with the work carrying trolleys 5 along the lower track. The upper and lower tracks are respectively supported by suitable frame structure which may be fixedly supported by the overhead structure of the building within which the conveyor system is installed.

The upper track 2 and the lower track 3 are both formed of I-beam rails. The lower track 3 is positioned directly below the upper track 2 throughout the length of the tracks and it will be appreciated that the upper track extends for the full length of the lower track in order that work carrying trolleys on the lower track may be positively driven by the work advancing trolleys moving along the upper track. The overlying tracks 2 and 3 are in the form of a closed loop (only a portion of the loop being shown in Figure 1) and a fixed branch track 9 extends across this loop.

Figure 2:
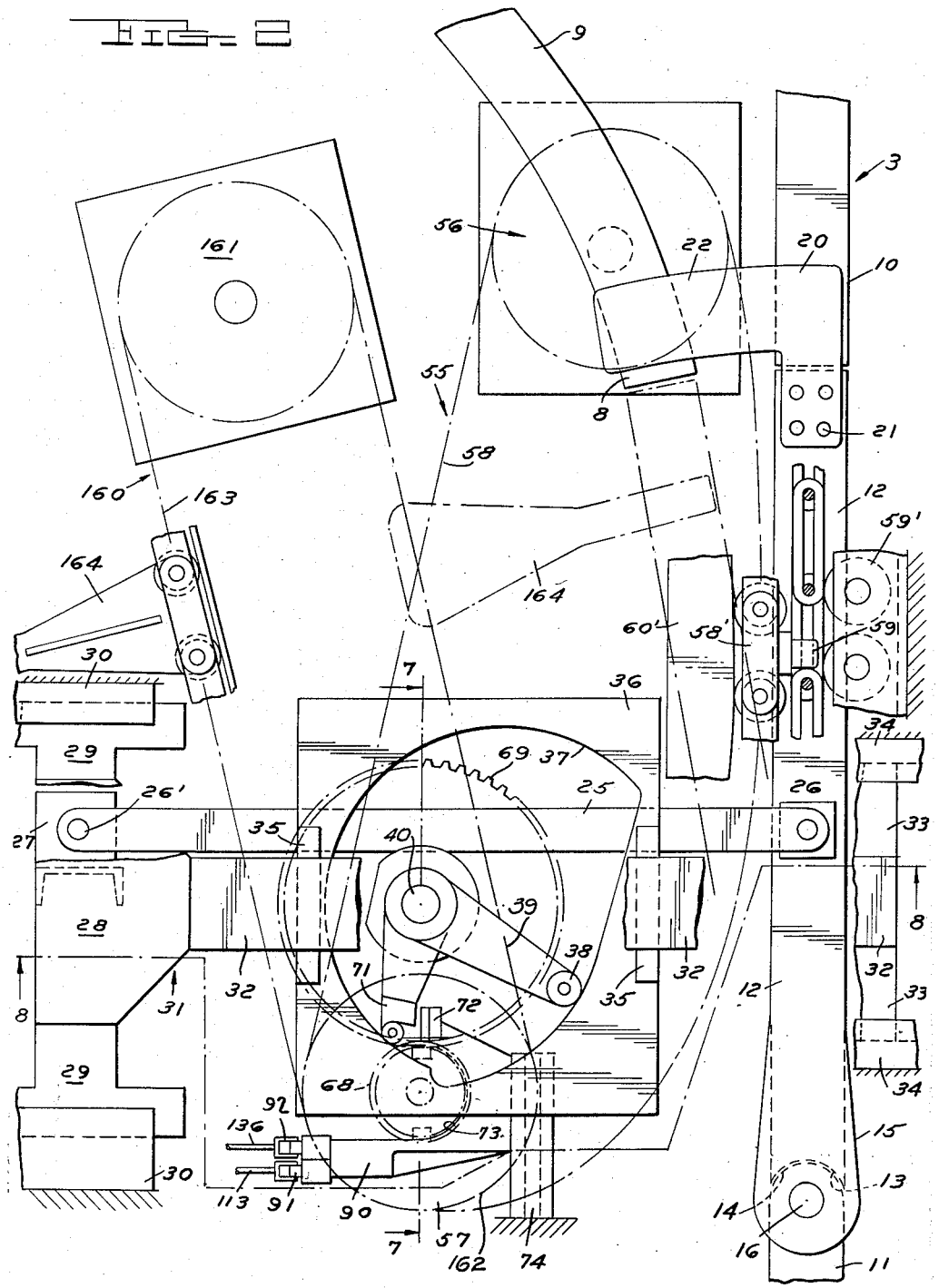
Figure 2 is a semi-diagrammatic plan view of a portion of the conveyor system shown in Figure 1, illustrating the exit switch.

The construction of the conveyor system in the region of the exit switch, i. e., the switch governing exit of trolleys from a main track to a branch track, is shown to advantage in Figure 2 of the drawings. As there illustrated, the portions 10 and 11 of the lower track 3 are generally aligned with each other but are spaced apart, and a switch track section 12 of I-beam construction extends between the adjacent ends of the portions 10 and 11 of the lower track.

The switch track 12 has one end pivotally connected to the end of portion 11 of the lower track enabling the switch track section to swing in a horizontal plane from the straight line position in which the free end thereof registers with the adjacent end of portion 10 of the lower track to a position in registration with the end 8 of the branch track 9. In this connection, it will be noted that the exit end portion 8 of the branch track 9 is disposed to one side of the portion 10 of the lower track closely adjacent to the free end of the switch track section when the latter is in its dotted line position shown in Figure 2, and the end of portion 10 of the lower track is also closely adjacent to the free end of the switch track section in its straight line position to enable work carrying trolleys moving along the portion 11 of the lower track in the direction of the arrows (Figure 1) to be transferred with ease by the switch to the branch track or to the main track portion 10.

It will also be noted that the pivoted end portion of the switch track section has a hollowed out or concave arcuate portion 13 which is shaped to receive the rounded convex portion 14 of the portion 11 of the lower track to accommodate the swinging movement of the switch track section. Any suitable pivotal connection between the lower track and the switch track section may be employed. In the present instance, the top flange of the switch track section has an extended ear 15 and a pivot pin 16 connects the ear to the end portion 11 of the lower track. Preferably, the web of main track portion 11 is notched to receive the extension 16' of the switch track as illustrated (Figure 18).

Referring to Figure 2 of the drawings, it will be noted that a plate 20 is secured to the top of the switch track section 12 by studs 21. Plate 20 is L-shaped and projects beyond the free end of the switch track section and laterally in the direction of the branch track. The construction is such that the bottom surface of the plate 20 rests upon the top surfaces of either the end portion 10 of the fixed main track or the adjacent end portion of the fixed branch track section 9 depending upon the position of the switch track section. In the straight line position of the switch track section in which the free end thereof registers with the main track, the plate 20 overlies and rests upon the top surfaces both of the main track and the branch track. In this connection it will be appreciated that the top surfaces of the main track and of the branch track are in a common horizontal plane.

The switch track section 12 is swung about the axis of pivot pin 16 by mechanism about to be described. Referring to Figures 2, 7 and 8, it will be noted that an arm 25 has one end pivotally connected to a block 26 secured to the top surface of switch track section 12 intermediate the ends thereof. The arm extends inwardly of the loop defined by the main track of the system and has its inner end pivotally connected at 26' to the lower end of a vertically extending column 27. The upper end of the column is secured to a bracket 28 which is part of a reciprocating mechanism 31 employed to reciprocate the column 27 and arm 25 and, hence, swing the switch track section between positions respectively registering with the end portion 10 of the main track and the adjacent end portion of the branch track. Projecting beyond opposite ends of the bracket 28 are the slide members 29 which slidably engage the laterally spaced fixed guideways 30 enabling sliding reciprocation of the sliding mechanism 31 in directions to accomplish the aforesaid swinging movement of the switch track section. An elongated plate 32 extends from the bracket 28 to a position above the upper track 2 and slide members 33 project laterally outwardly from the free end of plate 32 having sliding engagement with the guideways 34 supported upon the top surface of the upper track 2. The sliding mechanism 31 is thus supported for sliding reciprocation to accomplish the swinging movement of the switch track section in the manner set forth above.

Supported beneath the plate 32 by connecting members 35 is a cam plate 36 which has a cam opening 37 there through shaped to control the location and movement of the switch track section as will appear more fully hereinafter. A cam follower is provided and has a continuous rolling contact with the cam portion 37. The cam follower is in the form of a roller 38 pivotally supported on the outer end of an arm 39 which is keyed to the upper end of the vertically extending cam shaft 40. As seen in Figure 7, the cam shaft is rotatably supported in fixed position by portions 41 and 42 of the fixed frame structure. Rotation of the arm 39 causes the cam follower 38 to move around the periphery of the cam portion 37 causing the cam 36 and hence the sliding mechanism 31 to reciprocate and to alternately register the free end portion of the switch track with the branch track and the end portion 10 of the main track at the limits of reciprocation of the sliding mechanism.

Normally the parts will be in the position illustrated in Figure 2 of the drawing in which the switch track is aligned with the end portion 10 of the main track. However, when it is desired to switch a work carrying trolley to the branch track, the switch track section is swung to the dotted line position of Figure 2 in which it registers with the branch track. Suitable means are provided for driving the cam shaft when it is desired to shift the switch track from one position to the other. The arm 39 will move clockwise, as viewed in Fig. 2, and will, through cam plate 36, effect movement of the switch track 12 into registration with the branch track 9 upon movement of the arm 39 through a little less than 180°, this taking place before the actuating trolley 5 moves onto the switch track, as explained below. Continued clockwise rotation of arm 39 to its Fig. 2 position will return the switch track into alignment with track 10. The movement of switch track 12 is effected by cam plate 36 because the latter is carried by plate 32 of the sliding mechanism 31, and arm 25 is pivoted at its ends to the switch track and sliding mechanism.

The power for driving the cam shaft is taken from the chain 6 which is employed to advance the work advancing trolleys along the upper track 2. This chain may be of the ordinary link type driven in any suitable manner.

In the present instance, a caterpillar conveyer drive 50, shown in Figure 1, is employed to drive chain 6. This drive includes the sprockets 51 and 52 around which extends the driving chain 53 having driving dogs 54 projecting therefrom for engagement with successive links of the chain 6 to continuously drive the latter. Any suitable means may be provided to drive the caterpillar drive 50.

Another caterpillar conveyer 55 is employed in connection with the driving of the cam shaft 40. This caterpillar conveyer 55 comprises the sprockets 56 and 57 around which extends the chain 58 and as will be seen in Figure 2, certain links 58' of the chain 58 carry the outwardly projecting dogs 59 which are arranged for successive engagement with certain links of the chain 6 whereby the caterpillar conveyer 55 is driven by the chain 6. It will be appreciated that the caterpillar conveyer 55 and, hence, the sprocket 57 rotate continuously. Guides 59' and 60' respectively guide the chain 6 and the chain 58 in the region where dogs 59 of the chain 58 engage the links of chain 6.

In order to connect the sprocket 57 with the cam shaft 40, a clutch 60 is employed (see Fig. 7). One of the clutch parts 61 comprises an integral axial extension of the sprocket 57 and the other clutch part 62 is keyed to the vertically extending shaft 63 but axially slidable thereon. It will be noted from Figure 7 that the shaft 63 is supported for rotation by the portions 65 and 66 of the fixed frame structure and that the sprocket 57 is rotatably supported upon the shaft 63 by a bushing 67. A gear 68 keyed to the shaft 63 meshes with a somewhat larger gear 69 keyed to the cam shaft 40 and it will be apparent that upon engagement of the clutch 60 the caterpillar conveyer 55 will operate to drive the cam shaft 40.

A second arm 70 is keyed to the cam shaft 40 and this arm is provided to determine the limit of rotation of the cam shaft 40. Thus when the clutch 60 is engaged to rotate the cam shaft, the rotation of the cam shaft is limited to one complete revolution. As the arm 70 moves with the cam shaft, and toward the end of one complete revolution of the cam shaft, the inclined cam portion 71 carried by the arm 70 engages the cooperating inclined cam portion 72 carried by an arm of the yoke 73. As seen in Figures 2 and 8, the yoke 73 is pivotally supported to the fixed frame for rotation in a vertical plane by a pin 74 and the yoke arms straddle clutch part 62 and carry the inwardly extending rollers 75 positioned to engage in the annular groove 76 formed in the clutch part 62. Accordingly, upward swinging movement of the yoke 73 will operate to disengage the clutch parts. Thus the engagement of the cam portions 71 and 72 towards the end of one complete revolution of the cam shaft 40 will cause the clutch parts to disengage.

In order that the clutch parts may again engage at some later time, it is necessary to clear the cam portions 71 and 72. Moreover, there is the possibility that if the cam portions 71 and 72 are alone relied upon to disengage the clutch parts, the teeth of the clutch parts may brush against each other though disengaged, by reason of the fact that the clutch part 61 rotates continuously. Accordingly the arm 70 carries a roller 80 at its outer extremity which may be engaged by any one of the four equally circumferentially spaced lugs 83 projecting laterally outwardly from the clutch part 61. Thus as the sprocket 57 rotates, one of these lugs 83 will engage the roller 80 and give an extra increment of movement to the cam shaft 40 in its normal direction of rotation sufficient to cause the cam portion 71 to move past the cam portion 72 to completely clear these cam portions and to completely separate the teeth of the clutch parts. Suitable means are provided for retaining the clutch parts separated after the cam portions 71 and 72 have cleared each other and such means will be more fully described hereinafter.

Referring now to Figures 2, 4, 9, and 10, it will be noted that the yoke 73 has an integral extension 90 and the yoke is normally held in its upper position, in which the clutch parts are disengaged, by the latches 91 and 92. The yoke, when free of the latches, will move downwardly about the pivotal support 74 by reason of the weight of the yoke and the clutch part 62 and also under the influence of the tension spring 93 diagrammatically shown in Figure 4. The latches 91 and 92 are pivotally mounted at one end thereof by the pins 94 fixedly supported on the frame structure. These latches 91 and 92 have cutaway portions defining shoulders 95 and 96 respectively and the latches are normally urged toward the yoke by the tension springs 93 to a position in which the extension 90 of the yoke is supported on the shoulders of the latch members. In this position of the yoke, it is held in its upper position shown in Figure 7. It will be apparent that in order to move the switch track section to the dotted line position of Figure 2 in alignment with the branch track it will be necessary to retract the latches against the action of the springs 93 to release the yoke and thereby permit engagement of the clutch parts 61 and 62.

Figure 3:
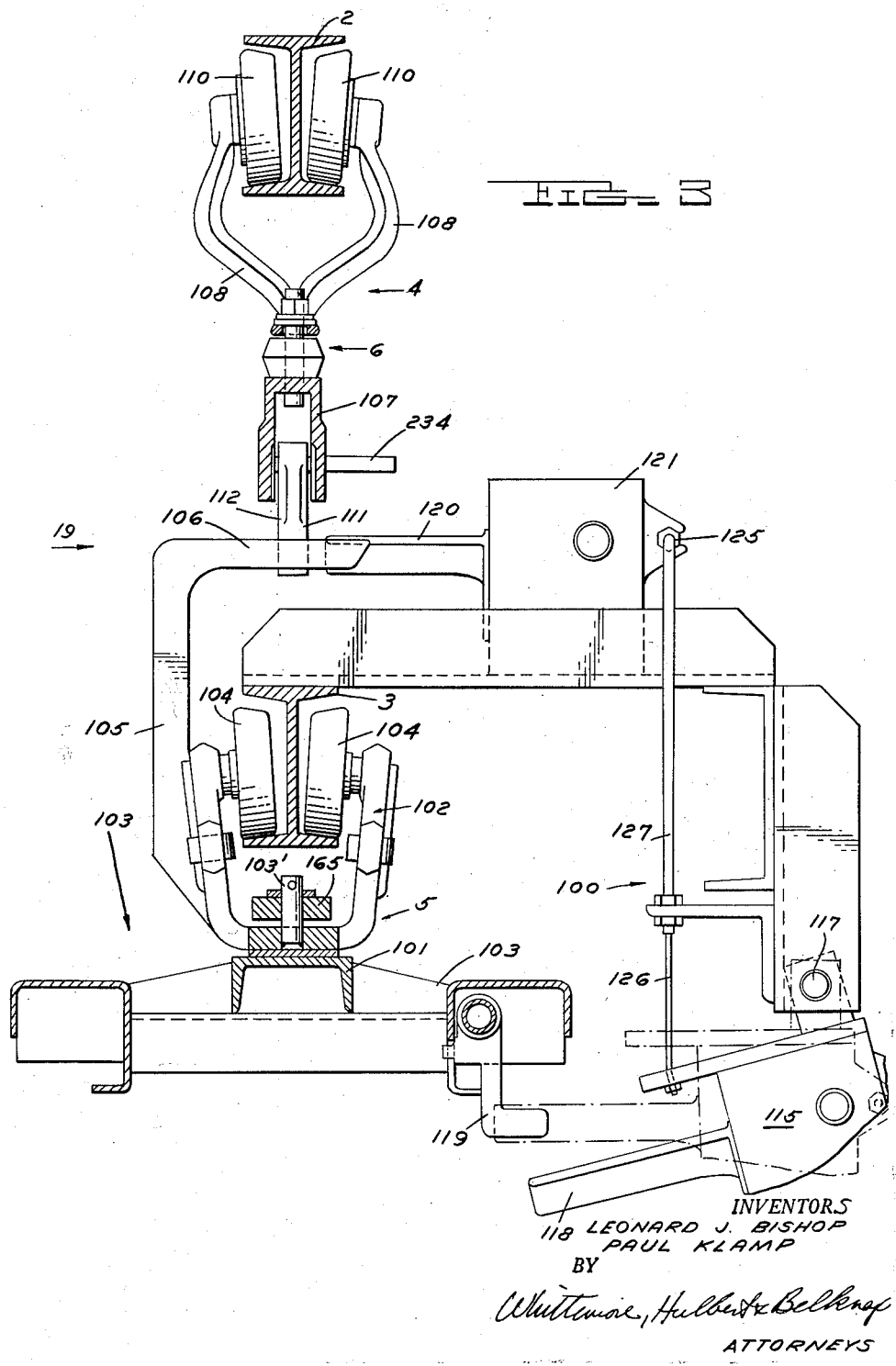
Figure 3 is a sectional view taken along the line 3—3 of Figure 1.

The latch 91 is controlled by a signal station 100 shown in Figures 3 and 4 and located adjacent the end portion 11 of main track 3 somewhat in advance of the switch track section 12.

As seen in Figure 3, each load-carrying trolley 5 comprises a load bar 101 extending lengthwise of the track 3, hangers 102 and a bumper frame 103. The load bar is secured to the bumper frame and vertical pins 103' pivotally connect the opposite ends of the load bar 101 to the U-shaped hangers. While only one hanger can be seen in Figure 3, the other is directly behind the one shown at the opposite end of the load bar. Rollers 104 carried by the arms of each hanger engage the bottom flange of the track 3 at opposite sides of the web. An upwardly extending arm 105 has its lower end secured to the load bar and projects to one side of the main track having a lateral extension 106 which extends over the main track by means of which the load-carrying trolleys may be pushed along by the advancing trolleys on track 2.

One of the advancing trolleys is shown in Figure 3 and embodies a pusher dog bracket 107 extending lengthwise of the track 2, which bracket 107 is channel-shaped in cross section and is secured to the underside of the chain 6 with the channel opening downwardly. The trolleys are connected to chain 6 at spaced intervals therealong. The chain 6 is supported from the upper track 2 by hangers 108 arranged in pairs at opposite ends of the pusher dog bracket. Again only one hanger can be seen in Figure 3. The hangers extend in an upward direction from the chain and each has laterally spaced arms which straddle the upper track and respectively support rollers 110. The rollers 110 are positioned to engage the top surface of the bottom flange of track 2 at opposite sides of the web.

It will be noted that a pair of dogs 111 (see Fig. 3) are carried by the pusher dog bracket 107. The upper ends of the dogs respectively project into the channel of the pusher dog bracket 107 adjacent opposite ends of the latter and are pivoted to the pusher dog bracket by pins 107' (see Fig. 19) for swinging movement in a vertical plane. The lower ends of the dogs 111 extend below the bottom of the pusher dog bracket and are weighted so that they are normally held in a depending position to engage the extension 106 of the load-carrying trolleys. It will be noted that the lower surfaces 112 of the dogs are inclined so that the extension 106 may cam its way into position between the dogs from either direction, and in this position the trolleys 5 can be advanced by trolleys 4.

Referring again to the signal station 100, it will be noted particularly in Figures 4 and 5, that one end of an actuator in the form of a push-pull cable 113 is connected to the latch 91 by a bracket 114 and the other end of the cable is connected to a rod 133 supported for axial sliding movement on signal box 115. This cable may be of flexible metal material and is encased in a flexible tubular sheathing 113' of rubber or the like, the cable being longitudinally shiftable relative to the sheathing by the application of a longitudinal force at one end thereof. One end of the sheathing is fixed at 114' and the cable projects therebeyond. The opposite end of the sheath 113' is secured to the signal box 115 as shown at 115'. Box 115 is normally in the position shown in solid lines in Figure 3, being pivotally secured to the frame structure for vertical swinging about the axis of pivot pin 117. In this position of the lever 118, the actuating arm 118 is in a position beneath the lug 119 carried by the load-carrying trolley 5. Accordingly so long as the arm 118 is in the solid line position of Figure 3, a work-carrying trolley moving along the main track 3 in advance of the switch 12 will not operate the latch 91 and hence latch 91 will remain in the Figure 4 position to hold the clutch parts disengaged. Hence the switch will remain in straight line position in registration with the main track.

A second operating arm 120 is included in the signal mechanism 100. The operating arm 120 is pivotally supported by pin 122 for horizontal swinging in a box 121 secured to the frame structure. The free end of the lever 120 is in a position for engagement by the free end of the extension 106 on the load-carrying trolley as the latter moves along the main track. As each load-carrying trolley moves along the lower track and past the signal station 100, the extension 106 engages lever 120 to swing the latter about its pivot causing the integral lug 123 thereon to engage the projection 124 on the axially slidable rod 125 carried by signal box 121 and shift the rod in one direction. Connected to one end of the rod 125 is a push-pull cable 126 supported in a sheath 127 for axial sliding movement and having its opposite end connected to the box 115. The opposite ends of the sheath are of course fixed as is true of all of the push-pull cables herein described. Thus whenever the operating arm 120 is engaged and rotated by reason of its contact with the extension 106 of a load-carrying trolley, the box 115 is raised to the dotted line position of Figure 3 in position to be engaged by the lug 119.

It will be appreciated of course that the box 115 will be held in the dotted line position only momentarily as the load-carrying trolley passes. Obviously it is necessary then in order for the lug 119 to engage the arm 118 and thus retract latch 91, that the lug 119 be located lengthwise along the load-carrying trolley in a position to engage arm 118 at the instant that it is raised to the dotted line position. In this connection, reference is made to Figure 5 wherein it will be noted that the lug 119 may be located in a number of different positions along the length of the load-carrying trolley. Thus when it is desired to switch a particular load-carrying trolley from the main track to the branch track, it is necessary only to attach the lug 119 to the load-carrying trolley in a position such that it will engage the arm 118 at the instant that it is raised to the dotted line position of Figure 3. Operation of the arm 118 will cause the latter to swing horizontally about its pivot 130 causing the integral lug 131 thereon to engage projection 132 on the axially slidable rod 133 supported in the box 115. Since the end of rod 133 is connected to the push-pull cable 113, the latch 91 will be retracted to free the yoke from the latch. Springs 134 normally hold the arms 118 and 120 in the extended positions of Figure 4.

However, both latches 91 and 92 must be retracted in order to enable the yoke to drop to a position in which the clutch parts 61 and 62 are engaged. One end of an actuator in the form of a push-pull cable 136 is secured to the latch 92 by a bracket 137 and the opposite end of the push-pull cable is connected to a rod 138 by a bracket 139, the rod being supported for axial sliding movement in the signal box 140. The cable sheath 140' is secured at fixed points 141'. The rod has a projection 141 which is engaged by the lug 142 on the lever arm 143, the lever arm being pivoted to the signal box 140 for horizontal swing movement about the axis of pin 143'. The lever arm 143 is located at the signal station 144 located along the branch track 9. As a work-carrying trolley moves along the branch track 9 and past the signal station 144, the extension 106 engages the free end of the arm 143 to actuate the push-pull cable 136 and retract latch 92. Arm 143 is normally urged to the Figure 5 position by tension spring 144'.

As seen in Figures 5 and 6, a stop station 145 is located on the branch track in advance of the signal station. This stop station consists of the dogs 146 pivotally mounted to the top surface of the track 9 by brackets 147 for swinging movement in a vertical plane. The dogs are weighted to normally assume the position of Figure 6 and have their top surfaces 148 inclined as illustrated so that the arm 106 of a trolley may enter the space between the dogs from either direction. The dog 146 farthest from the switch 12 has a cable 149 attached thereto to manually lower the same to enable a workman to push the trolley past the stop station.

One purpose of the branch track is to enable the load-carrying trolleys to be brought to a position beyond the signal station 144 where certain operations may be performed on the work. Once a particular trolley passes the signal station 144, it indicates that the stop station 145 is open and accordingly free to receive a second work-carrying trolley.

It will be noted from Figure 9 of the drawing that the shoulder 95 of latch 91 is cut somewhat deeper than the shoulder 96 of latch 92 so that when both latches are in a position to engage the yoke 73 (Figure 9), the yoke is actually supported by the shoulder 96 of the latch 92 only. Thus when the lever 92 is withdrawn by the movement of a trolley along the branch track past signal station 144, the yoke will then drop slighly into supporting engagement with the shoulder 95 of latch 91 so that latch 92 will thereafter be held in the Figure 10 position by reason of its engagement with the yoke. The purpose of this is that the latch 92 is only momentarily operated by a work-carrying trolley moving past signal station 144 on the branch track. Thereafter, when the latch 91 is withdrawn by a work-carrying trolley on the main track, the yoke is free to drop to a position in which the clutch parts 61 and 62 engage to operate the mechanism for moving the switch track section into registration with the branch track.

The fact that the shoulder 95 of the latch 91 is cut somewhat deeper than the shoulder of the other latch also enables the latch 91 to move in and out with respect to the yoke freely as the trolleys move along the main track at times when the stop station on the branch track is occupied and in which event the latch 92 is in engagement with the yoke 73 as in Fig. 9.

A transfer conveyer is generally indicated at 160 (see Figs. 1 and 2). This conveyer comprises the sprockets 161 and 162 about which extends the conveyer chain 163. The sprocket 162 is keyed to the lower end of shaft 63 so that the transfer conveyer is driven whenever the clutch parts 61 and 62 are engaged and thus simultaneously with the operation of the cam shaft 40. The transfer conveyer chain is of the pivoted link type and has a pusher dog 164 secured to the chain and projecting outwardly therefrom. The chain 163 is of such a length and the gearing 68, 69 such that the dog 164 will make one complete transit around the path of the chain each time the clutch parts are engaged. Its normal rest position is shown in solid lines in Figure 2. However, when the clutch parts are engaged to shift the switch track section into registration with the branch track, the dog 164 will move downwardly from its Figure 2 position and around the path of its supporting chain to engage the roller 165, Fig. 8, supported on a pin 103' of a load-carrying trolley as the trolley moves on to the switch track section to push it along the switch track and on to the inclined portion 167, Fig. 1, of the branch track. The inclined portion 167 extends from the end of the branch track entirely to the stop station 145.

It will be appreciated that the dogs 111 on the work advancing trolleys have sufficient clearance therebetween to enable the work-carrying trolleys to become disengaged therefrom on transfer to the branch track.

The arrangement is such that the pusher dog 164 will engage a trolley 5 after the switch track 12 has been swung into alignment with the end 8 of the branch track. The cam 37 is shaped so that continued rotation of the cam-shaft 40 will not move the sliding mechanism which controls the position of the switch track 12 until the dog 164 has moved to a position slightly above the dotted line position shown in Figure 2 to complete the transfer of a trolley 5 to the branch track 9. Thereafter, the cam 37 in cooperation with the rotating cam follower 38 will cause the sliding mechansim 31 to return the switch track 12 to its straight line position in registration with the end portion 10 of the main track 3. Thereupon, the clutch parts 61 and 62 will become disengaged to stop the reciprocation of the sliding mechanism 31 in the position shown in Figure 2 and also to stop the transfer conveyer 160 with the dog 164 positioned as shown in solid lines in Figure 2. The clutch part 62 will raise yoke 73 to an elevation in which the latches again support it.

Operation of the exit switch

The operation of the conveyer system in the region of the exit switch should be readily apparent from the foregoing. The chain 6 will move continuously in a position directly above the main track 3. The work advancing trolleys 4, Fig. 3, are supported by and movable along the upper track 2 and are connected to the chain 6 at spaced intervals therealong and are adapted to advance the work carrying trolleys 5 along the main track 3 in the manner described above. In the event that it is desired to switch a load-carrying trolley 5 from the main track to the branch track 9, the lug 119, Fig. 4, is secured to the bumper frame 103 in adjusted position along the length thereof in a position where it will engage the lever arm 118 of the signal box 115 at substantially the same instant that the signal box is raised to the dotted line position of Figure 3 by the engagement of the lever arm 120 with the extension 106 on the trolley. Of course, if a particular trolley is not intended to be switched to the branch track, the lug 119 will be placed in some other position lengthwise of the bumper frame where it will pass the lever arm 118 when the latter is in its lower position wherein the lever arm 118 will not be actuated. Under these circumstances, the switch track 12 will remain in its straight line position.

However, assuming the first condition in which the lug 119 engages the arm 118, the latch 91 will be withdrawn as the trolley 5 moves past the signal station 100. However, since the operation of the switch track depends upon signal station 144 as well as signal station 100, the switching mechanism will not be energized by the retraction of latch 91 unless latch 92 operated by the signal station 144 is also withdrawn. Assuming that latch 92 is not withdrawn, the trolley 5 will not be switched to the branch track even though it is desired that that particular trolley be switched to the branch track.

The reason for this is to prevent the switching of a trolley to the branch track when the stop station 145 is already occupied. Assuming that the stop station 145 is occupied, the trolley at this station may be moved along by merely pulling the cable 149, Figs. 1 and 6, to release the trolley from the stop station from whence it may be moved manually along the branch track and past the signal station 144. As the trolley moves past the signal station 144, the extension 106 thereon engages the operating arm 143, Fig. 5, of the signal station to withdraw the latch 92 from supporting relation with the yoke. Although the tension on the push-pull cable 136 is only momentarily applied, nevertheless the latch 92 is prevented from returning to a position in which it supports the yoke by reason of the fact that the supporting shoulder 95 of latch 91 is cut back more deeply than the supporting shoulder 96 of latch 92 (see Fig. 10). Hence the latch 92 will remain withdrawn from supporting relation to the yoke 73 after the trolley on the branch track has moved past the signal station 144. Obviously then the next time a trolley 5 whose lug 119 is positioned to indicate that that trolley is to be switched to the branch track passes the signal station 100, the other latch, 91, will be withdrawn to release the yoke 73 and initiate operation of the switching mechanism to transfer the trolley to the branch track.

The entrance switch, i. e., the switch governing entry or return from the branch track 9 to the main track 3, is in many ways similar to the exit switch described above. As seen in Figure 17, the end portions 200 and 201 of the main track 3 are generally aligned with each other but are spaced apart, and a switch track section 202 of I-beam construction extends between the adjacent end portions 200 and 201.

The switch track 202 has one end pivotally connected to the end portion 201 of the lower track enabling the switch track to swing in a horizontal plane from the straight line position in which the free end thereof registers with the end portion 200 to a position in registration with the end 203 of the branch track 9. When the switch track is moved in a clockwise direction about its pivotal connection with the main track, it comes into registration with the end 203 of the branch track and it will be apparent that trolleys 5 moving along the main track portion 200 or along the branch track may be readily transferred across the switch track to the main track portion 201 by suitably positioning the switch track.

The pivotal connection between the switch track and the main track is indicated at 204 and is exactly the same as the pivotal connection between the switch track 12 and the end portion 11, Fig. 1.

The free end of the switch track 202 also has a plate for supporting the free end of the switch track on the main track and on the branch track. This plate is similar to the plate 20 on the switch 12 and is indicated by the reference numeral 205.

The mechanism for swinging the switch track 202 about its axis of swinging movement is substantially the same as that described in connection with the exit switch. As seen in Figure 17, a reciprocating sliding mechanism is provided for moving the switch track 202 alternately between positions registering with the main track and with the branch track. Since this mechanism is the same as that employed in connection with the exit switch, it is identified by the same reference character 31. Moreover, other portions of this sliding mechanism such as the guideways are likewise identified by reference numerals corresponding to similar portions of the exit switch sliding mechanism. The switch track 202 is connected to the sliding mechanism by an arm which is identified by the numeral 25 since it is identical with the arm 25 previously described, this arm having one end pivotally connected to the switch track at 26 and having the other end pivoted to the lower end of a vertically extending column 27 at 26'.

As in the mechanism for the exit switch, the operating mechanism for the entrance switch includes the cam 36 having the cam shaped opening 37, the cam being secured to the underside of the arm 32 by the connecting block members 35. The sliding mechanism is reciprocated back and forth between limiting positions in which the switch track 202 registers with the main track and with the branch track respectively, and this mechanism is identical with the mechanism illustrated in Figures 7 and 8 except of course that the operation is reversed and shifts the switch track 202 clockwise for registration with the branch track instead of counterclockwise as in the case of the exit switch. Thus the camshaft 40 for the entrance switch mechanism when driven, moves the arm 39 keyed thereto in a circular path and the roller 38 on the outer end of the arm engages the periphery of the cam opening 37 to slide the reciprocating mechanism back and forth. Figures 7 and 8 actually constitute mirror images of the operating mechanism for the entrance switch.

The camshaft 40 for the entrance switch is operated by the caterpillar conveyor 55 which is identical to the caterpillar conveyor 55 for the exit switch. This caterpillar conveyor likewise has the dogs 59 engageable between certain links of the chain 6 to be continuously driven thereby. The sprocket 57 of the caterpillar conveyor for the entrance switch drives the shaft 63, upon which it is mounted for free rotation, when the clutch 60 is engaged. Shaft 63 is of course connected to camshaft 40 by gearing 68, 69. Engagement of the clutch depends upon downward swinging movement of the yoke 73 about its pivot 74 when released by the latches 91 and 92. These latches are identical with the latches 91 and 92 previously described in connection with the exit switch and support the yoke in a raised position by engagement with an extension of the yoke to maintain the clutch parts separated. Clutch part 62 is slidably supported on shaft 63 for rotation as a unit therewith and part 61 integral with sprocket 57. These latches are resiliently urged to latching position and the illustrations of Figures 9 and 10 illustrate the construction of these latches as well as the exit switch latches.

The transfer conveyor for the entrance switch is indicated at 215 and is slightly different from the transfer conveyor for the exit switch. The transfer conveyor 215 has the sprockets 161 and 162, the latter being secured to the shaft 63 for rotation therewith. The transfer conveyor 215 differs from the transfer conveyor 160 only in that the length of the chain 216 is substantially twice as long as the chain 163. Accordingly, two dogs 164 are secured to the chain 216 and extend outwardly therefrom being positioned on the chain so that equal lengths of chain extend between the dogs in either direction around the chain. As in the case of the exit mechanism, the entrance mechanism incorporates the arm 70 having the cam 71 engageable with the cam 72 on the yoke 73, and the roller 80 engageable with lugs 83, as in Fig. 7, all for a like purpose.

It is not believed necessary to go into a further description of the mechanism for operating the entrance switch and the transfer conveyor for the entrance switch in view of the fact that these parts are already illustrated in Figures 7, 8, 9 and 10 and therefore already described in connection with the description of the exit switch. However, it will be necessary to describe the signal stations for operating the entrance switch.

Referring now to Figures 14, 15 and 16 of the drawings, there is shown a signal station 220 which is supported upon the fixed frame structure and which comprises a signal box 221 having therewith spaced parts 222 and 223 formed with vertically aligned openings slidably receive a plunger 224. The plunger 224 is normally urged in a downward direction by a compression spring 225 interposed between the upper part 223 and a washer 226 supported upon a shoulder of the plunger. The limit of downward movement of the plunger is determined by the engagement of a roller 227 journalled on the lower end of the plunger with the upper end of a depending lever arm 228 pivoted to the signal box by a pin 229 at a point adjacent its upper end for swinging movement in a vertical plane in the direction of length of the main track. The lever arm 228 normally assumes the position illustrated in Figures 14 and 15 by reason of the weight of the lower end.

The upper end of the arm has a recessed portion 230 normally engaged by the roller 227 on the plunger to hold the plunger in the position illustrated in Figures 14 and 15. The upper end of the plunger is of reduced diameter and has a bearing secured thereon which supports an operating lever 231 for rotation about the axis of the plunger in a horizontal plane. The arm 231 is normally disposed in the position of Figure 14 in which it extends in a direction transversely of the main track 3 with the outer end portion 232 disposed for engagement with the entrance dogs 234 respectively secured to and extending laterally from the pusher dog brackets 106 of the work advancing trolleys 6 movable along the upper track 2. The operating arm 231 is normally held in the Figure 14 position by the depending pin 235 secured thereto and having the lower end connected to a coil spring 236. Any tendency for the arm 231 to turn about the axis of plunger 224 is thus resisted by the spring 236.

The push-pull cable for operating the entrance latch 91 from signal station 220 is indicated at 113 encased in a rubber tubing 113', Fig. 16. These reference numerals are the same as those employed in connection with the signal station 100 for the entrance switch. One end of the cable is connected to the plunger 237 which is supported for reciprocation along its axis in the box 221 and in the direction of length of the main track 3. Normally the spring urging the latch 91 to its latching position will hold the plunger 237 in the Figure 16 position. An intermediate portion of plunger 237 has an elongated recess 238 therein. A lug or projection 239 depends from the operating arm 231 at a point intermediate the ends thereof and the lower end of the lug extends into recess 238. Each time an empty work advancing trolley 6 passes station 220, the operating arm 231 is rotated about the axis of the plunger 224 by the entrance dog 234 thereon. Such rotation of the operating arm 231 causes movement of lug 239 to the left as viewed in Figure 16 to correspondingly move plunger 237 and to withdraw latch 91 from engagement with the yoke 73. The latch 91 has its supporting shoulder cut deeper than the supporting shoulder of the latch 92 so that it can move in and out of supporting relation to the yoke without interference, as in Fig. 10.

The latch 91 will not be withdrawn by a particular work advancing trolley 4 moving toward the entrance switch if that particular trolley is, at the time, advancing a work carrying trolley 5 along the main track. In this instance, the bumper frame 103 of the work carrying trolley will engage the depending portion of lever 228 to rock the latter and cause a cam portion 240 on the upper end of the lever to raise the plunger 224 and correspondingly raise the operating arm 231 sufficiently for lug 239 to be withdrawn completely from recess 238. Thus rotation of the arm 231 by engagement with the entrance dogs on the work advancing trolleys will have no effect upon the push-pull cable 113. It is, of course, possible to design the cam surface 240 so that the operating arm 231 will be raised a sufficient distance to completely clear the entrance dogs.

Thus it will be understood that only empty work advancing trolleys 4 operate to withdraw the latch 91 controlled by the signal station 200. However, both latches 91 and 92 must be withdraw in order to initiate the operation of the mechanism for moving the switch track 202 into registration with the end 203 of the branch track.

Referring now to Figures 11, 12 and 13, the signal station 250 is shown. This signal station controls the operation of the latch 92 for supporting the yoke 73 of the entrance switch. Assuming that it is now desired to move a work carrying trolley from the branch track 9 back onto the main track 3, it may be advanced by manual effort or otherwise to the position illustrated in Figures 11 and 13. It will be noted that prior to reaching this position the trolley passed a backstop 251. The backstop is supported on the branch track as by a bracket 252 secured to the top of the branch track and this bracket rotatably supports a pivot pin 253 extending in the direction of length of the branch track. Secured to the pin 253 for rotation therewith is a member 254 having a depending stop portion 255 which has rounded cam shaped underside 256 whereby a trolley may move past the backstop in the direction of the arrow in Figure 11. As seen in Figure 13, it is the extension 106 on the trolley which cams past the backstop causing member 254 to swing upwardly. The rear edge 257 of the stop part 255 extends vertically and prevents the trolley from moving back beyond the backstop after it has once passed the latter.

In the position of Figures 11 and 13 of the trolley in which it has passed the backstop 251, it moves into engagement with the free end of the operating arm 258, further advance being prevented by the stop arm 276. Arm 258 is shown in Figure 11 rotated counterclockwise from the position it normally assumes under the influence of the tension spring 259 extending between the arm and the fixed backstop. The arm 258 is supported for rotation about the axis of pin 260 and in the Figure 11 position the cam shaped portion 261 integral with the arm engages the projection 262 on the block 263 supported for free rotation on the pin 264, turning the latter clockwise to the position illustrated and placing a tension on the push-pull cable 136 sufficient to withdraw latch 92 from supporting relation with the yoke 73. The push-pull cable is slidable in the rubber tubing 140' and is secured to the rotatable block 263. It will be apparent that when a work advancing trolley 4 is in the position shown in Figures 11 and 13, the latch 92 will be held withdrawn from supporting relation with the yoke so that whenever an empty work advancing trolley 4 moves past signal station 220, the mechanism for moving the switch 202 will be energized. Of course if no trolley is on the branch track at the signal station 250, the arm 258 will turn clockwise from the position shown to release the tension on cable 136. As will be remembered from the description of the exit switch, the transfer conveyor 215 is geared to the camshaft of the switching mechanism so as to operate simultaneously therewith. One of the dogs 164 carried by the transfer conveyor 215 is shown in Figure 11. Immediately upon initiation of the operation of the switching mechanism to move the switch 202 from its position in registration with the main track to a position in registration with the branch track, the transfer conveyor is also operated and the advancing dog 164 has a cam portion 270 which engages a roller 271 carried by the arm 272 fixedly secured to the pin 264. Also fixed to the shaft 264 is a latch arm 273, the outer end portion of which is hook shaped as shown at 274 to engage the latching shoulder 275 of a stop arm 276. This stop arm 276 normally prevents movement of the work carrying trolley beyond the backstop. However, when the roller 271 is engaged by the initially advancing dog 164 on the transfer conveyor, the latch arm 273 is turned in a clockwise direction to release the stop arm 276 and to permit the work advancing trolley to be advanced past the stop arm upon engagement of the roller 165, Fig. 13, on the trolley by the dog 164. A tension spring 280 interconnects the stop arm 276 and the latch arm 273, normally urging them to the position illustrated.

By the time the transfer conveyor 215 has moved the trolley to the end portion 203 of the branch track, the sliding reciprocating mechanism 31 has moved the switch 202 into registration with the branch track so that continued operation of the transfer mechanism will move the trolley completely on to the main track where it may be picked up by the empty work advancing trolley 4 which operated the signal station 220 to initiate the operation of the switching mechanism. After the transfer to the main track has been completed, the cam 36 of the sliding mechanism 31 returns the switch 202 to its original position in registration with the main track and the clutch parts 61 and 62 are separated to discontinue the operation of the switching mechanism and transfer conveyor. Clutch part 62, cam-lifted, raises yoke 73 to an elevation in which the latches 91 and 92 again support it. The transfer conveyor will move a distance around the back of its chain equal to one-half the length of the chain so that the two dogs thereon, in effect, simple change positions. The reciprocating mechanism 31 returns to its original position resulting from one complete rotation of the camshaft.

*Operation of the entrance switch*

The operation of the entrance switch is believed to be readily apparent from the foregoing. In order for the entrance switch to be operated, there must be a waiting trolley 4 on the branch track at the signal station 250. It is also necessary that the work advancing trolley moving past the signal station 220 be empty. The presence of both these conditions will operate to withdraw both latches 91 and 92 to initiate the switching operation.

It will be seen that the signal stations are mechanically connected to the mechanism for driving the switching mechanism and the transfer conveyor for both the exit and entrance switches thereby entirely eliminating the necessity for limit switches and the associated wiring and other expensive electrical equipment required in that type of system.

What we claim as our invention is:

1. A conveyor system comprising a main track having generally aligned first and second track sections spaced from each other, a branch track section positioned to one side of the first main track section, a switch track section extending between the adjacent ends of said main track sections and pivoted to the second main track section for swinging movement from a straight line position in registration with said first main track section to a position in registration with said branch track section, trolleys movable in the direction of said main track, an endless mechanism to drive said trolleys along said main track, power operated means driven by said endless mechanism for swinging the free end of said switch track section from registration with said first main track section into registration with said branch track section, and means for actuating said power operated means comprising an actuator mechanically connected to said power operated means and having a part engageable by a trolley moving in the direction of said main track in advance of said switch track section to initiate operation of said power operated means to swing said switch track section from its straight line position into registration with said branch track section.

2. A conveyor system comprising a main track having generally aligned first and second track sections spaced from each other, a branch track section positioned to one side of the first main track section, a switch track section extending between the adjacent ends of said main track sections and pivoted to the second main track section for swinging movement from a straight line position in registration with said first main track section to a position in registration with said branch track section, trolleys movable in the direction of said main track, power means for thus moving said trolleys, means including a member connected to said switch track section for swinging the free end of said switch track section from registration with said first main track section into registration with said branch track section, a clutch having parts movable into engagement with each other to connect said power means to said member to actuate said member, means urging said parts relatively toward each other, a latch normally preventing engagement of said clutch parts, and an actuator mechanically connected to said latch for retracting said latch to permit clutching engagement of said clutch parts under the influence of said last mentioned means, said actuator having a part engageable with a trolley moving toward said switch track section to retract said latch enabling engagement of said clutch parts to swing said switch track section from its straight line position into registraiton with said branch track section.

3. A system as defined in claim 2 having a second latch normally preventing engagement of said clutch parts, a second actuator mechanically connected to said second latch for retracting said second latch to permit engagement of said clutch parts, said second actuator having a part engageable by a trolley on said branch track section to retract said second latch.

4. A system as defined in claim 3 in which said actuators each comprise a push-pull cable, and a sheath for each cable, said cables being movable relative to said sheaths.

5. A conveyor system comprising a main track having generally aligned first and second track sections spaced from each other, a branch track section positioned to one side of the second main track section, a switch track section extending between the adjacent ends of the main track sections and pivoted to the first main track section for swinging movement from a straight line position in registration with the second main track section to a position in registration with the branch track section, trolleys movable along said track sections, power operated means for swinging the free end of said switch track section from registration with said second main track section into registration with said branch track section, and means for actuating said power operated means comprising an actuator mechanically connected to said power operated means and having a part engageable by a trolley moving along said first main track section toward and in advance of said switch track section to initiate operation of said power operated means to swing the switch track section from its straight line position into registration with said branch track section before the trolley reaches said switch track section.

6. A conveyor system comprising a main track having generally aligned first and second track sections spaced from each other, a branch track section positioned to one side of the second main track section, a switch track section extending between the adjacent ends of the main track sections and pivoted to the first main track section for swinging movement from a straight line position in registration with the second main track section to a posititon in registration with the branch track section, trolleys movable along said track sections, power operated means including a member connected to said switch track section for swinging the free end of said switch track section from registration with said second main track section into registration with said branch track section, power means, movable means shiftable to one position to operatively connect said power means to said member, and an actuator for operating said movable means mechanically connected to said movable means, said actuator having a part engageable by a trolley moving along said first main track section toward and in advance of said switch track section to shift said movable means to said one position for actuating said member to swing the switch track section from its straight line position into registration with said branch track section before the trolley reaches the switch track section.

7. A system as defined in claim 6 including means operative upon movement of said switch track section into registration with said branch track section for moving a trolley on said first main track section along said switch track section and onto said branch track section.

8. A system as defined in claim 7 having a second actuator mechanically connected to said movable means normally preventing shifting of said movable means to said one position, said second actuator having a part engageable by a trolley on said branch track to free said shiftable means from the influence of said last mentioned member.

9. A conveyor system comprising a main track having generally aligned first and second track sections spaced from each other, a branch track section positioned to one side of the second main track section, a switch track section extending between the adjacent ends of the main track sections and pivoted to the first main track section for swinging movement from a straight line position in registration with the second main track section to a position in registration with the branch track section, trolleys movable along said rack sections, power operated means including a member connected to said switch track section for swinging the free end of said switch track section from registration with said second main track section into registration with said branch track section, power means, a clutch having parts movable into engagement with each other to operatively connect said power means to said member, means operatively connected to one of said parts for urging said parts relatively toward each other into engagement, a latch normally preventing engagement of said parts, and an actuator mechanically connected to said latch for retracting said latch to permit clutching engagement of said parts under the influence of the last mentioned means, said actuator having a part engageable by a trolley moving along said first main track section to retract said latch enabling engagement of said clutch parts for actuating said member to swing said switch track section from its straight line position into registration with said branch track section.

10. A system as defined in claim 9 in which said actuator comprises a push-pull cable, and a sheath for said cable, said cable being movable relative to said sheath.

11. A system as defined in claim 9 having a trolley stop station on said branch track station, a second latch normally preventing engagement of said clutch parts, a second actuator mechanically connected to said second latch for retracting said second latch to permit engagement of said clutch parts, said second actuator having a part engageable by a trolley moving along said branch track beyond said stop station to retract said second latch.

12. A system as defined in claim 11 having means for holding said second latch retracted following engagement of said part on said second actuator by a trolley on said branch track section.

13. A conveyor system comprising a main track having generally aligned first and second track sections spaced from each other, a branch track section positioned to one side of the second main track section, a switch track section extending between the adjacent ends of the main track sections and pivoted to the first main track section for swinging movement from a straight line position in registration with the second main track section to a position in registration with the branch track section, trolleys movable along said track sections, power operated means including a member connected to said switch track section for swinging the free end of said switch track section from registration with said second main track section into registration with said branch track section, power means, a clutch having parts movable into engagement with each other to operatively connect said power means to said member, means operatively connected to one of said parts for urging said parts relatively toward each other into engagement, a latch engageable with one of said parts normally preventing engagement of said parts, and an actuator mechanically connected to said latch for retracting said latch to permit clutching engagement of said parts under the influence of the last mentioned means, said actuator having a part engageable by a trolley moving along said first main track section to retract said latch enabling engagement of said clutch parts for actuating said member to swing said switch track section from its straight line position into registration with said branch track section, a trolley stop station on said branch track station, a second latch engageable with one of said parts normally preventing engagement of said clutch parts, a second actuator mechanically connected to said second latch for retracting said second latch to permit engagement of said clutch parts, said second actuator having a part engageable by a trolley moving along said branch track beyond said stop station to retract said second latch and means operative upon movement of said switch track section into registration with said branch track section for moving a trolley on said first main track section along said switch track section onto said branch track section.

14. A system as defined in claim 13 in which continued operation of said member effects the return of said switch track section to straight line position, and cam means for separating said clutch parts after return of said switch track section to straight line position.

15. A system as defined in claim 14 in which said actuators each comprise a push-pull cable, and a sheath for each cable, said cables being movable relative to said sheaths.

16. A conveyor system comprising a main track having generally aligned first and second track sections spaced from each other, a branch track section positioned to one side of the second main track section, a switch track section extending between the adjacent ends of the main track sections and pivoted to the first main track section for swinging movement from a straight line position in registration with the second main track section to a position in registration with the branch track section, trolleys movable along said track sections, power means for moving said trolleys along said main track in a direction from said first main track section to said second main track section, means including a member connected to said switch track section for swinging the free end of said switch track section from registration with said second main track section into registration with said branch track section, a clutch having parts movable into engagement with each other to connect said power means to said member to actuate said member, means urging said clutch parts toward each other, a latch engageable with one of said parts normally preventing engagement of said parts, an actuator mechanically connected to said latch for retracting said latch to permit clutching engagement of said parts under the influence of said last-mentioned means, said actuator having a part engageable by a trolley moving along said first main track section to retract said latch enabling engagement of said clutch parts for actuating said member to swing said switch track section from its straight line position into registration with said branch track section, a trolley stop station on said branch track section, a second latch engageable with said one part normally preventing engagement of said clutch parts, a second actuator mechanically connected to said second latch for retracting said second latch to permit engagement of said clutch parts, said second actuator having a part engageable by a trolley moving along said branch track beyond said stop station to retract said second latch, said first and second latches having first and second shoulders respectively for engaging said one clutch part and preventing the latter from moving toward the other clutch part, said first shoulder being cut back relative to said second shoulder so that said one clutch part is normally engaged by said second shoulder only, retraction of said second latch permitting said one clutch part to move slightly toward said other clutch part into engagement with said one shoulder and into blocking relation to said second latch preventing return of the latter and engagement of said one clutch part by said second shoulder.

17. A system as defined in claim 16 including means operative upon movement of said switch track section into registration with said branch track section for moving a trolley on said first main track section along said switch track section onto said branch track section.

18. A system as defined in claim 17 in which said member is operative to return said switch track section to straight line position, and cam means operative to separate said clutch parts after return of said switch track section to straight line position.

19. A system as defined in claim 18 in which each actuator comprises a push-pull cable, and a sheath for each cable, said cable being movable relative to said sheath.

20. A conveyor system comprising a main track, trolleys movable along said track, power means including an endless linear member for moving said trolleys along said track, a branch track, a switch track having one end registering with said main track and the other end movable from registration with said main track into registration with said branch track, means for moving said other end of said switch track into registration with said main track and branch track respectively, means for moving trolleys along said switch track and onto said branch track when the switch track registers with said branch track, and clutch means operated by a trolley moving along said main track for mechanically coupling the last mentioned means to said linear member to operate said last-mentioned means solely by said power means.

21. A conveyor system comprising a main track having generally aligned first and second track sections, spaced from each other, a branch track section positioned to one side of the first main track section, a switch track section extending between the adjacent ends of said main track sections and pivoted to the second main track section for swinging movement from a straight line position in registration with said first main track section to a position in registration with said branch track section, work carrying trolleys supported by and movable along said track sections, work advancing trolleys movable along said main track in a direction from the first toward the second main track section and engageable with said work carrying trolleys from advancing the latter, power operated means including a member connected to said switch track section for swinging the free end of said switch track section from registration with said first main track section into registration with said main track section, power means, a clutch having parts movable into engagement with each other to operatively connect said power means to said member to actuate said member, means urging said parts relatively toward each other into engagement, a latch engageable with one of said clutch parts and normally preventing engagement of said clutch parts, and an actuator mechanically connected to said latch for retracting said latch from engagement with said one part to permit clutching engagement of said parts under the influence of said last mentioned means, said actuator having a part engageable by an advancing trolley moving along said first main track section to retract said latch enabling engagement of said clutch parts for actuating said member to swing said switch track section from its straight line position into registration with said branch track section.

22. A conveyor system comprising a main track having generally aligned first and second track sections, spaced from each other, a branch track section positioned to one side of the first main track section, a switch track section extending between the adjacent ends of said main track sections and pivoted to the second main track section for swinging movement from a straight line position in registration with said first main track section to a position in registration with said branch track section, work carrying trolleys supported by and movable along said track sections, work advancing trolleys movable along said main track in a direction from the first toward the second main track section and engageable with said work carrying trolleys from advancing the latter, power operated means including a member connected to said switch track section for swinging the free end of said switch track section from registration with said first main track section into registration with said branch track section, power means, a clutch having parts movable into engagement with each other to operatively connect said power means to said member to actuate said member, means urging said parts relatively toward each other into engagement, a latch engageable with one of said clutch parts and normally preventing engagement of said clutch parts, and an actuator mechanically connected to said latch for retracting said latch from engagement with said one part to permit clutching engagement of said parts under the influence of said last mentioned means, said actuator having a part engageable by an advancing trolley moving along said first main track section to retract said latch enabling engagement of said clutch parts for actuating said member to swing said switch track section from its straight line position into registration with said branch track section, a trolley stop station on said branch track section, a second latch engageable with said one clutch part to normally prevent engagement of said clutch parts, a second actuator mechanically connected to said second latch for retracting the latter from engagement with said one clutch part, said second actuator having a part engageable by a work carrying trolley at said stop station to retract said second latch from engagement with said one clutch part.

23. A system as defined in claim 22 in which said actuators each comprise a push-pull cable, and a sheath for each cable, said cables being movable relative to said sheaths.

24. A system as defined in claim 22 including means operative upon movement of said switch track section into registration with said branch track section for moving a work carrying trolley on said branch track section along said switch track section onto said second main track section.

25. A system as defined in claim 24 in which said member is operative to return said switch track section to straight line position, and cam means operative to separate said clutch parts after return of said switch track section to straight line position.

26. A conveyor system comprising a main track having generally aligned first and second track sections spaced from each other, a branch track section positioned to one side of the first main track section, a switch track section extending between the adjacent ends of said main track sections and pivoted to the second main track section for swinging movement from a straight line position in registration with said first main track section to a position in registration with said branch track section, work carrying trolleys supported by and movable along said track sections, work advancing trolleys movable along said main track in a direction from the first toward the second main track section and engageable with said work carrying trolleys from advancing the latter, power operated means for swinging the free end of said switch track section from registration with said first main track section into registration with said branch track section, means for actuating said power operated means comprising an actuator mechanically connected to said power operated means and having a part engageable by a portion of a work advancing trolley moving along said first main track section to initiate operation of said power operated means to swing said switch track section from its straight line position into registration with said branch track section, and means operative upon movement of said switch track section into registration with said branch track section for moving a work carrying trolley on said branch track section along said switch track section onto said second main track section.

27. A system as defined in claim 26 including a second actuator mechanically connected to said power operated means normally rendering said power operated means inoperative, said second actuator having a part engageable by a work carrying trolley on said branch track section to free said power operated means from the influence of said second actuator.

28. A conveyor system comprising a main track having generally aligned first and second track sections spaced from each other, a branch track section positioned to one side of the second main track section, a switch track section extending between the adjacent ends of the main track sections and pivoted to the first main track section for swinging movement from a straight line position in registration with the second main track section to a position in registration with the branch track section, trolleys movable along said track sections, power operated means for swinging the free end of said switch track section from registration with said second main track section into registration with said branch track section, means for actuating said power operated means comprising an actuator mechanically connected to said power operated means and having a part engageable by a trolley moving along said first main track section to initiate operation of said power operated means to swing the switch track section from its straight line position into registration with said branch track section, and a second actuator mechanically connected to said power operated means normally preventing operation of the latter, said second actuator having a part engageable by a trolley moving along said branch track section to free said power operated means from the influence of said second actuator.

29. A conveyor system comprising a main track having generally aligned first and second track sections spaced from each other, a branch track section positioned to one side of the first main track section, a switch track section extending between the adjacent ends of said main track sections and pivoted to the second main track section for swinging movement from a straight line position in registration with said first main track section to a position in registration with said branch track section, work carrying trolleys supported by and movable along said track sections, work advancing trolleys movable along said main track in a direction from the first toward the second main track section and engageable with said work carrying trolleys from advancing the latter, power operated means for swinging the free end of said switch track section from registration with said first main track section into registration with said branch track section, means for actuating said power operated means comprising an actuator mechanically connected to said power operated means and having a part engageable by a portion of a work advancing trolley moving along said first main track section to initiate operation of said power operated means to swing said switch track section from its straight line position into registration with said branch track section, and a second actuator mechanically connected to said power operated means normally preventing operation of the latter, said second actuator having a part engageable by a trolley on said branch track section to free said power operated means from the influence of said second actuator.

30. A conveyor system comprising a main track, load carrying trolleys movable along said main track, a pusher trolley track extending along said main track, pusher trolleys movable along said pusher trolley track and engageable with said load carrying trolleys to propel the latter along said load carrying track, a power driven endless chain connected to said pusher trolleys for moving the latter, a branch track to one side of said main track, a switch track having one end registering with said main track and the other end movable from registration with said main track into registration with said branch track, means for moving said other end of said switch track into registration with said main track and branch track respectively, means for moving load carrying trolleys along said switch track when the latter registers with said branch track, and means for operatively mechanically coupling the first and second mentioned means to said endless chain to operate said first and second mentioned means solely by said endless chain.

31. A system as defined in claim 30 including actuating means for said mechanical coupling means, and a control dog on one of said load carrying trolleys for operating said actuating means.

32. A conveyor system comprising a main track having generally aligned first and second track sections spaced from each other, a branch track section positioned to one side of the second main track section, a switch track section extending between the adjacent ends of the main track sections and pivoted to the first main track section for swinging movement from a straight line position in registration with the second main track section to a position in registration with the branch track section, trolleys movable along said track sections, power means for moving said trolleys along said main track in a direction from the first to the second section thereof, mechanism for swinging the free end of said switch track section from registration with said second main track section into registration with said branch track section, means for connecting said power means to said mechanism for operating the latter, and an actuator mechanically connected to said last-named means for actuating the latter, said actuator having a part engageable by a trolley moving along said first main track section to operate said actuator.

33. A conveyor system comprising a main track having generally aligned first and second track sections spaced from each other, a branch track section positioned to one side of the second main track section, a switch track section extending between the adjacent ends of the main track sections and pivoted to the first main track section for swinging movement from a straight line position in registration with the second main track section to a position in registration with the branch track section, trolleys movable along said track sections, power means for moving said trolleys along said main track in a direction from the first to the second section thereof, mechanism for swinging the free end of said switch track section from registration with said second main track section into registration with said branch track section, means for propelling said trolleys through said switch track section from said first main track section to said branch track section when said switch track section is in registration with said branch track section, means for connecting said power means to said propelling means for operating the latter, and an actuator mechanically connected to said last-named means for actuating the latter, said actuator having a part engageable by a trolley moving along said first main track section to operate said actuator.

34. A conveyor system comprising a main track having generally aligned first and second track sections spaced from each other, a branch track section positioned to one side of the first main track section, a switch track section extending between the adjacent ends of said main track sections and pivoted to the second main track section for swinging movement from a straight line position in registration with said first main track section to a position in registration with said branch track section, work carrying trolleys supported by and movable along said track sections, work advancing trolleys movable along said main track in a direction from the first toward the second main track section and engageable with said work carrying trolleys from advancing the latter, power means for thus moving said work advancing trolleys, mechanism for swinging the free end of said switch track section from registration with said first main track section into registration with said branch track section, means for connecting said power means to said mechanism for operating the latter, and an actuator mechanically connected to said last-named means for actuating the latter, said actuator having a part engageable by a work advancing trolley moving toward said switch track section to operate said actuator.

35. A conveyor system comprising a main track having generally aligned first and second track sections spaced from each other, a branch track section positioned to one side of the first main track section, a switch track section extending between the adjacent ends of said main track sections and pivoted to the second main track section for swinging movement from a straight line position in registration with said first main track section to a position in registration with said branch track section, work carrying trolleys supported by and movable along said track sections, work advancing trolleys movable along said main track in a direction from the first toward the second main track section and engageable with said work carrying trolleys from advancing the latter, power means for thus moving said work advancing trolleys, mechanism for swinging the free end of said switch track section from registration with said first main track section into registration with said branch track section, means for propelling said work carrying trolleys through said switch track section from said branch track section to said second main track section when said switch track section is in registration with said branch track section, means for connecting said power means to said propelling means for operating the latter, and an actuator mechanically connected to said last-named means for actuating the latter, said actuator having a part engageable by a work advancing trolley moving toward said switch track section to operate said actuator.

36. A conveyor system comprising a load carrying track, load carrying trolleys supported by said track for movement therealong, an endless driven power member having means engageable with said trolleys to so move the same, a further load carrying track in non-meeting relation to said first track at a switch zone, a track switch having means mounting the same at said switch zone for movement to and from a position in which it connects said tracks with one another, said track switch in said connecting position supporting said trolleys for movement therealong from one track to the other, means to propel said trolleys along said track switch, means to drive said propelling means mechanically from said endless power member, and means to control said track switch in its movement, said last named means being driven mechanically by a line of power originating at said endless power member and including a control device adjacent said first track operated mechanically by trolleys moving along the same, a further control device adjacent said further track operated mechanically by trolleys moving along said further track, and mechanical control connections between said respective control devices and said track switch, said respective connections being operatively connected to said track switch whereby said track switch moves to said connecting position only upon operation of both said control devices by trolleys on said respective first and further tracks.

37. A conveyor system comprising a load carrying track, load carrying trolleys supported by said track for movement therealong, an endless driven power member having means engageable with said trolleys to so move the same, a further load carrying track in non-meeting relation to said first track at a switch zone, a track switch having means mounting the same at said switch zone for movement to and from a position in which it connects said tracks with one another, said track switch in said connecting position supporting said trolleys for movement therealong from one track to the other, means to propel said trolleys along said track switch, means to drive said propelling means mechanically from said endless power member, and means to control said track switch in its movement, said last named means being driven mechanically by a line of power originating at said endless power member and including a control device adjacent said first track operated mechanically by trolleys moving along the same, a further control device adjacent said further track operated mechanically by trolleys moving along said further track, and mechanical control connections between said respective control devices and said track switch, including elements operated respectively by said control devices and operatively connected to said switch track to conjointly control a movement of the latter to said connecting position only upon operation of both said control devices by trolleys on said respective first and further tracks.

38. A conveyor system comprising a load carrying track, load carrying trolleys supported by said track for movement therealong, an endless driven power member having means engageable with said trolleys to so move the same, a further load carrying track in non-meeting relation to said first track at a switch zone, a track switch having means mounting the same at said switch zone for movement to and from a position in which it connects said tracks with one another, said track switch in said connecting position supporting said trolleys for movement therealong from one track to the other, an endless transfer device having means to propel said trolleys along said track switch, means to drive said transfer device mechanically from said endless power member, and means to control said track switch in its movement, said last named means being driven mechanically by a line of power originating at said endless power member and including a control device adjacent said first track operated mechanically by trolleys moving along the same, a further control device adjacent said further track operated mechanically by trolleys moving along said further track, and mechanical control connections between said respective control devices and said track switch, including elements operated respectively by said control devices and operatively connected to said switch track to conjointly control a movement thereof to said connecting position only upon operation of both said control devices by trolleys on said respective first and further tracks.

39. A conveyor system in accordance with claim 38, in which said control connections between said control device and track switch further comprise a member operatively connected to said track switch for concurrent movement with the latter, and in which said last named elements are positioned to have restraining engagement with said member to prevent said concurrent movement until conjointly operated by said respective control devices.

40. A conveyor system in accordance with claim 38, in which said control connections between said control device and track switch further comprise a member operatively connected to said track switch for concurrent movement with the latter, and in which said last named elements are latch elements positioned to have restraining engagement with said member to prevent said concurrent movement until conjointly operated by said respective control devices, said elements being positioned relative to one another and said member whereby one of said elements has restraining engagement with said member only after the other element is operated to release it from restraining engagement.

41. A conveyor system in accordance with claim 38, in which said control connections between said control device and track switch further comprise a member operatively connected to said track switch for concurrent movement with the latter, and in which said last named elements are latch elements positioned to have restraining engagement with said member to prevent said concurrent movement until conjointly operated by said respective control devices, said elements being positioned relative to one another and said member whereby the element operated by the control device adjacent said first track has restraining engagement with said member only after the other element is operated to release it from restraining engagement.

42. A conveyor system in accordance with claim 38, in which said control connections between said control device and track switch further comprise a releasable clutch having parts drivingly connected respectively to said endless power member and transfer device, respectively, said clutch being engageable to connect said parts, said last named elements being latch elements holding said clutch disengaged until conjointly operated by said control devices to engage the clutch.

43. A conveyor system comprising a track to guide load units for movement, means engageable with said units to move the same along said track, a further track in angular relation to said first track at a switch zone, a switch having means mounting the same at said switch zone for movement to and from a position in which it guides said units for movement from one track to the other, and means to control said switch in its movement, including a first signal device adjacent one track operated mechanically by units moving along the same, a further signal device adjacent the other track operated mechanically by units moving along the latter, a third device controlling movement of said switch, and means mechanically connecting said first and further signal devices with said third device to cause movement of the switch controlled thereby to said guiding position only upon operation of both said first and further signal devices by units traveling along said respective tracks.

44. A conveyor system comprising a track to guide load units for movement, means engageable with said units to move the same along said track, a further track in angular relation to said first track at a switch zone, a switch having means mounting the same at said switch zone for movement to and from a position in which it guides said units for movement from one track to the other, said switch in said position supporting said units for movement therealong from one track to the other, and means to control said switch in its movement, including a first signal device adjacent one track operated mechanically by units moving along the same, a further signal device adjacent the other track operated mechanically by units moving along the latter, a third device controlling movement of said switch, and means mechanically connecting said first and further signal devices with said third device to cause movement of the switch controlled thereby to said guiding position only upon operation of both said first and further signal devices by units traveling along said respective tracks.

45. A conveyor system comprising a track to guide load units for movement, an endless driven power member having means engageable with said units to move the same along said track, a further track in angular relation to said first track at a switch zone, a switch having means mounting the same at said switch zone for movement to and from a position in which it guides said units for movement from one track to the other, said switch in said position supporting said units for movement therealong from one track to the other, means to propel said units along said switch, means to drive said propelling means mechanically from said endless power member, and means to control said switch in its movement, including a first signal device adjacent one track operated mechanically by units moving along the same, a further signal device adjacent the other track operated mechanically by units moving along the latter, a third device controlling movement of said switch, and means mechanically connecting said first and further signal devices with said third device to cause movement of the switch controlled thereby to said guiding position only upon operation of both said first and further signal devices by units traveling along said respective tracks.

46. A conveyor system comprising a track to guide load units for movement, means engageable with said units to move the same along said track, a further track in angular relation to said first track at a switch zone, a switch having means mounting the same at said switch zone for movement to and from a position in which it guides said units for movement from one track to the other, and means to control said switch in its movement, including a first signal device adjacent one track operated mechanically by units moving along the same, a further signal device adjacent the other track operated mechanically by units moving along the latter, a third device controlling movement of said switch, and means mechanically connecting said first and further signal devices with said third device to cause movement of the switch controlled thereby to said guiding position only upon operation of both said first and further signal devices by units traveling along said respective tracks, said third device comprising a pair of elements connected respectively to said first and further signal devices and operated successively by the same.

47. A conveyor system comprising a track to guide load units for movement, an endless driven power member having means engageable with said units to move the same along said track, a further track in angular relation to said first track at a switch zone, a switch having means mounting the same at said switch zone for movement to and from a position in which it guides said units for movement from one track to the other, said switch in said position supporting said units for movement therealong from one track to the other, means to propel said units along said switch, means to drive said propelling means mechanically from said endless power member, and means to control said switch in its movement, including a first signal device adjacent one track operated mechanically by units moving along the same, a further signal device adjacent the other track operated mechanically by units moving along the latter, a third device controlling movement of said switch, and means mechanically connecting said first and further signal devices with said third device to cause movement of the switch controlled thereby to said guiding position only upon operation of both said first and further signal devices by units traveling along said respective tracks, said third device comprising a pair of elements connected respectively to said first and further signal devices and operated successively by the same.

References Cited in the file of this patent

UNITED STATES PATENTS

| | | |
|---|---|---|
| 1,625,501 | Robertson | Apr. 19, 1927 |
| 1,690,502 | Raymond | Nov. 6, 1928 |
| 1,775,545 | Anderson | Sept. 9, 1930 |
| 2,527,244 | Culver | Oct. 24, 1950 |
| 2,684,039 | King | July 20, 1954 |
| 2,714,355 | Benson | Aug. 2, 1955 |